US010296200B2

(12) United States Patent
Adler et al.

(10) Patent No.: US 10,296,200 B2
(45) Date of Patent: May 21, 2019

(54) DRAG AND DROP MAP FOR MARKING PICKUP AND DROP OFF LOCATIONS ON A PREDETERMINED LINE

(71) Applicant: GT Gettaxi Limited, Limassol H.E. (CY)

(72) Inventors: Tal Adler, Tel Aviv (IL); Adi Inbar, Tel Aviv (IL); Gil Sela, Holon (IL); Josef Halevi, Tel Aviv (IL)

(73) Assignee: GT Gettaxi Limited, Limassol (CY)

( * ) Notice: Subject to any disclaimer, the term of this patent is extended or adjusted under 35 U.S.C. 154(b) by 207 days.

(21) Appl. No.: 15/259,508

(22) Filed: Sep. 8, 2016

(65) Prior Publication Data

US 2018/0067620 A1 Mar. 8, 2018

(51) Int. Cl.
| | |
|---|---|
| *G06F 17/00* | (2019.01) |
| *G06F 3/0486* | (2013.01) |
| *G06F 3/0482* | (2013.01) |
| *G06Q 50/30* | (2012.01) |
| *H04L 29/06* | (2006.01) |
| *G01C 21/00* | (2006.01) |
| *G06Q 10/04* | (2012.01) |
| *G06F 3/0488* | (2013.01) |
| *H04L 29/08* | (2006.01) |

(52) U.S. Cl.
CPC .......... *G06F 3/0486* (2013.01); *G01C 21/00* (2013.01); *G06F 3/0482* (2013.01); *G06F 3/04883* (2013.01); *G06Q 10/047* (2013.01); *G06Q 50/30* (2013.01); *H04L 67/42* (2013.01); *H04L 67/10* (2013.01)

(58) Field of Classification Search
CPC .............................. G06F 3/0486; G06Q 50/30

USPC ................ 715/201, 203, 862, 863
See application file for complete search history.

(56) References Cited

U.S. PATENT DOCUMENTS 9,158,414 B1 10/2015 Gluzberg et al.
2005/0075119 A1 4/2005 Sheha et al.
(Continued)

OTHER PUBLICATIONS

Uber, by Uber Technologies, Inc. https://itunes.apple.com/us/app/uber/id368677368?mt=8, retrieved on Jun. 30, 2016.
(Continued)

*Primary Examiner* — Stephen S Hong
*Assistant Examiner* — Matthew J Ludwig
(74) *Attorney, Agent, or Firm* — Lowenstein Sandler LLP

(57) ABSTRACT

Systems and methods for dragging and dropping a map for marking pickup and drop off locations on a predetermined route are disclosed. A method includes receiving a first user selection of a predetermined route that includes a plurality of segments corresponding to geographical locations along the predetermined route. The method further includes transmitting data to cause a map including at least a portion of the predetermined route to be rendered for display. The method further includes receiving a second user selection of a pickup location on the map corresponding to a first segment, a third user selection of a drop off location on the map corresponding to a second segment, and a transportation vehicle request corresponding to the pickup location and the drop off location. The method further includes transmitting the transportation vehicle request, the pickup location, and the drop off location to a communication device of a transportation vehicle.

20 Claims, 13 Drawing Sheets

(56) References Cited

U.S. PATENT DOCUMENTS

| | | | |
|---|---|---|---|
| 2006/0220374 A1* | 10/2006 | Dorn | B42D 15/00 |
| | | | 283/115 |
| 2014/0129951 A1 | 5/2014 | Amin et al. | |
| 2015/0369621 A1* | 12/2015 | Abhyanker | G01C 21/36 |
| | | | 701/461 |
| 2016/0034828 A1* | 2/2016 | Sarawgi | G06Q 10/02 |
| | | | 705/5 |
| 2016/0117610 A1* | 4/2016 | Ikeda | G06Q 10/02 |
| | | | 705/5 |
| 2016/0189438 A1* | 6/2016 | Bang | G06Q 10/00 |
| | | | 701/29.4 |
| 2017/0169366 A1* | 6/2017 | Klein | G06Q 10/025 |

OTHER PUBLICATIONS https://developers.google.com/maps/documentation/roads/snap#demo, retrieved on Jun. 30, 2016.
http://wtp2.appspot.com/cSnapToRouteDemo.html, retrieved on Jun. 30, 2016.
http://www.kmcgraphics.com/google/, retrieved on Jun. 30, 2016.
Extended European Search Report dated Jun. 9, 2017, on application No. 17154443.01-1871.

* cited by examiner

DRAG AND DROP MAP FOR MARKING PICKUP AND DROP OFF LOCATIONS ON A PREDETERMINED LINE

TECHNICAL FIELD

This disclosure relates to transportation services and, in particular, to marking pickup and drop off locations on a predetermined route.

BACKGROUND

Transportation services, such as ridesharing and taxi services, often provide their services via client computing device application interfaces. The interfaces may allow users to request a pick-up by a driver of a transportation vehicle and a drop off location. However, in many situations, the addresses must be added manually or by moving a selection icon on a line while the selection icon is not snapped to a line. This is inconvenient and may lead to less than optimal dispatching of transportation vehicles to handle the requests.

BRIEF DESCRIPTION OF THE DRAWINGS

The disclosure is illustrated by way of example, and not by way of limitation, in the figures of the accompanying drawings, in which.

DETAILED DESCRIPTION

Figure 1:
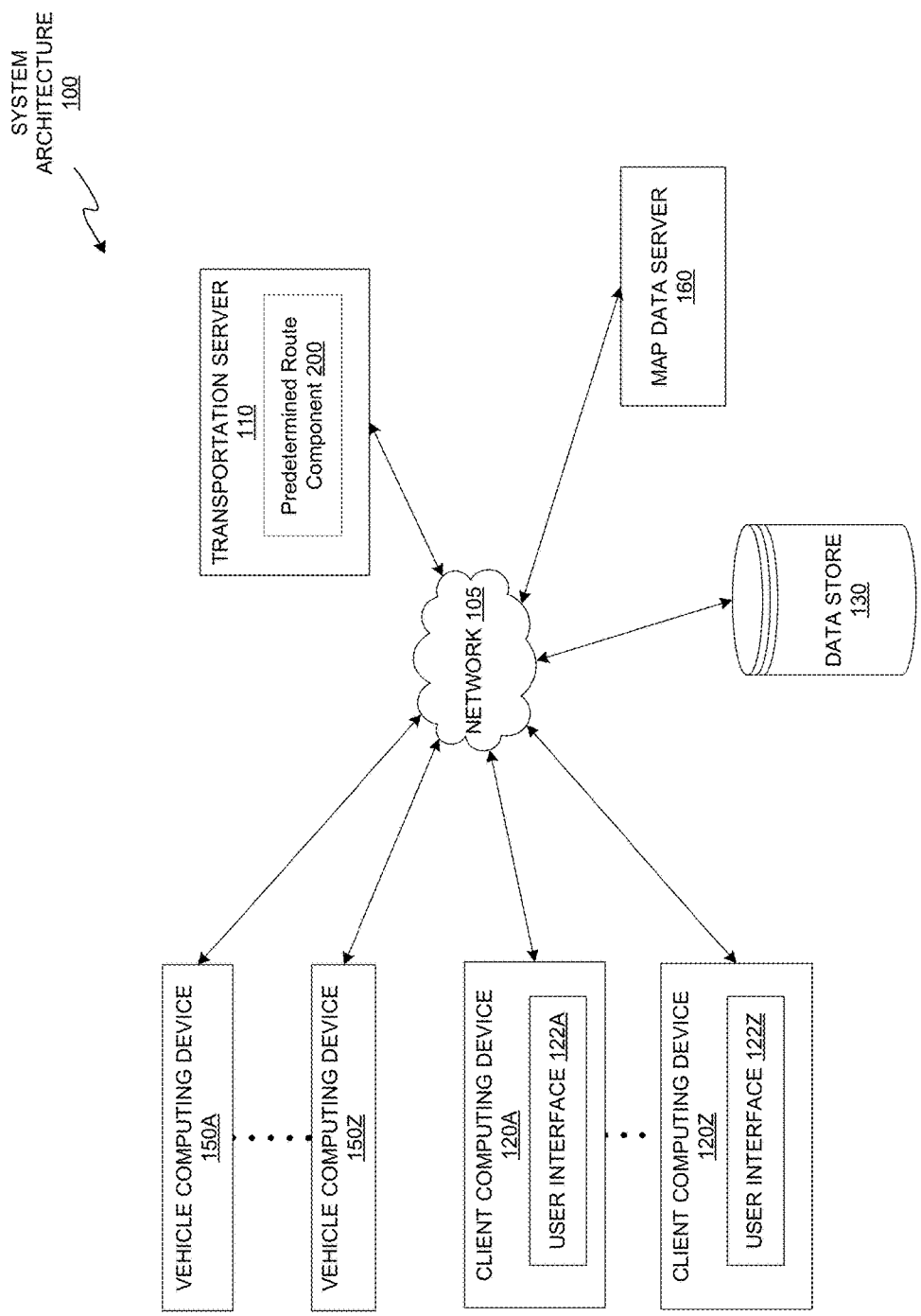
FIG. 1 illustrates an example system architecture in accordance with an implementation of the disclosure.

Described herein are systems and methods for dragging and dropping a map for marking pickup and drop off locations on a predetermined route (e.g., predetermined line).

A user may request transportation services from a pickup location to a drop off location. A transportation vehicle may accept the request and transport the user from the pickup location to the drop off location over a route (e.g., one or more roads) between the pickup location and the drop off location. There are common routes used by a plurality of users each day.

Conventional transportation services receive a vehicle transportation request from a user and transmit the vehicle transportation request to one or more drivers proximate to the pickup location of the user. The transportation vehicle request may include one or more of a pickup location, a drop off location, a user profile, a type of transportation vehicle request (e.g., ridesharing, taxi, class of vehicle, etc.). After a driver transports a first user across a first route from a first pickup location to a first drop off location, the driver may travel a distance to a second pickup location to transport a second user from the second pickup location to a second drop off location. The distance between the first drop off location and the second pickup location may necessitate time, energy, and resources for which the driver and transportation services are not being compensated. These uncompensated distances may lead to inefficiencies and increased cost for the transportation services, the drivers, and the users. The distance between the first drop off location and the second pick up location can also lead to increased wait time and frustration for the user.

A system of transportation services over one or more predetermined routes can be beneficial to the users, the drivers, and the transportation services provider. A predetermined route can include a plurality of pick up locations and corresponding plurality of drop off locations used by a plurality of users. For example, a predetermined route may be $2^{nd}$ Avenue in New York, N.Y. One or more transportation vehicles may travel back and forth on the predetermined route, transporting users along the predetermined route. The predetermined route may be divided into a plurality of segments corresponding to locations where a transportation vehicle may pick up or drop off a user. A plurality of users may select a pickup location and a drop off location from the plurality of segments along the predetermined route.

Transportation services along the predetermined route may reduce inefficiencies of conventional transportation services. Transportation vehicles can travel back and forth along the predetermined route, which may reduce distance between a first drop off location and a second pickup location and may reduce time that a user must wait for a transportation vehicle after making a request. Benefits of a predetermined route may include one or more of lower costs, higher profits, less user wait time between sending a vehicle transportation request and being picked up by a transportation vehicle, less driver wait time between dropping off a first user and picking up a second user, and so forth.

A system of transportation services provided by establishing a communication session, over a network, between a server computing device and a client computing device also has technological advantages. The technological advantages may include one or more of increased flexibility, faster search times, smaller memory requirements, reduced processing times, reduced bandwidth latency, increased efficiency, etc. as further described in conjunction with FIG. 1.

In one aspect of the disclosure, a method includes establishing a communication session, over a network, between a server computing device and a client computing device. The server computing device receives, from the client computing device, a first user selection of a predetermined route. The predetermined route includes a plurality of segments, each of the plurality of segments corresponding to a geographical location along the predetermined route. The server computing device transmits, to the client computing device, data to cause a graphical user interface (GUI) representation of a map including at least a portion of the predetermined route to be rendered for display via a device interface of the client computing device. The server computing device receives, from the client computing device, a second user selection of a pickup location on the map corresponding to a first segment of the plurality of segments, a third user selection of a drop off location on the map corresponding to a second segment of the plurality of segments, and a transportation vehicle request corresponding to the pickup location and the drop off location. The server computing device transmits the transportation vehicle request, the pickup location, and the drop off location to a communication device of a transportation vehicle.

In one implementation, the method further includes receiving a device location of the client computing device and determining the predetermined route is most proximate to the device location out of one or more predetermined routes. The transmitting of the data to cause the GUI representation of the map including the at least a portion of the predetermined route to be rendered is subsequent to the determining the predetermined route is the most proximate and prior to the receiving of the first user selection.

In one implementation, the method further includes receiving a device location of the client computing device, determining the first segment is most proximate to the device location out of the plurality of segments, and transmitting, to the client computing device, data to cause the GUI representation of the map to further include a first object and a second object to be rendered for display via the device interface of the client computing device. The first object corresponds to the device location and the second object corresponds to the first segment, the second object including the pickup location.

In one implementation, the method further includes, prior to receiving the third user selection of the drop off location, accessing user history corresponding to the client computing device, determining the second segment corresponds to a previous drop off location in the accessed user history, and in response to the determining the second segment corresponds to the previous drop off location, transmitting, to the client computing device, data to cause the GUI representation of the map to further include a third object to be rendered for display via the device interface of the client computing device, where the third object corresponds to the second segment and the third object includes a proposed drop off location.

In one implementation, the GUI representation of the map is to display a first object at a proposed pickup location corresponding to a third segment of the plurality of segments, receive a map drag input, relocate the first object to a new location on the GUI representation of the map in response to receiving the map drag input, and snap the first object to the first segment subsequent to receiving the map drag input, where the first segment is most proximate to the new location out of the plurality of segments.

In one implementation, the GUI representation of the map is to display a second object at a proposed drop off location corresponding to a fourth segment of the plurality of segments, receive a map drag input to drag the map to a new location, relocating the second object to the new location on the GUI representation of the map in response to receiving the map drag input, and snap the second object to the second segment subsequent to the receiving the map drag input, where the second segment is most proximate to the new location out of the plurality of segments.

In one implementation, each geographic location along the predetermined route is where one or more transportation vehicles are allowed to pick up or drop off users.

In one or more of the disclosed implementations, systems (e.g., systems including memories, processing devices, etc.) for performing operations of the aforementioned methods are also disclosed. Additionally, in implementations of the disclosure, a computer-readable storage medium (e.g., a non-transitory computer-readable storage medium, a non-transitory machine-readable storage medium) may encode operations for performing the aforementioned methods.

FIG. 1 illustrates an example system architecture 100, in accordance with an implementation of the disclosure. The system architecture 100 includes a transportation server 110, client computing devices 120A-120Z, a data store 130, vehicle computing devices 150A-150Z, and a map data server 160. The components 110-160 may be communicatively coupled and/or connected via a network 105. In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, the network 105 may be a combination of different types of networks.

In one implementation, the transportation server 110 and the map data server 160 may each correspond to one or more computing devices (e.g., a rackmount server, a router computer, a server computer, a personal computer, a mainframe computer, a laptop computer, a tablet computer, a desktop computer, etc.), data stores (e.g., hard disks, memories, databases), networks, software components, and/or hardware components. The transportation server 110 may utilize data received from the map data server 160 to manage, monitor, and communicate with vehicle computing devices 150A-150Z in order to allocate and route transportation vehicles to different locations. Specifically, the transportation server 110 may include a predetermined route component 200 (which may be executed by a processing device of the transportation server 110) that is capable of receiving orders from client computing devices 120A-120Z, transmitting order requests to the vehicle computing devices 150A-150Z, dispatching transportation vehicles (e.g., taxis), and performing location tracking of the transportation vehicles. In some implementations, the predetermined route component 200 may process payments from users to pay for rides and or trips or award.

A communication session may be established over network 105, between transportation server 110 and client computing devices 120A-120Z. Information can be received and transmitted over network 105 between one or more of the transportation server 110 (e.g., predetermined route component 200), vehicle computing device 150, client computing device 120, data store 130, map data server 160, and so forth. This configuration over network 105 can provide one or more of increased flexibility, faster search times, smaller memory requirements, reduced processing times, reduced bandwidth latency, increased efficiency, etc. In one implementation, one or more of the network devices (e.g., transportation server 110, client computing devices 120A-120Z, data store 130, vehicle computing devices 150A-150Z, map data server 160, etc.) has smaller memory requirements because the memory requirements are distributed among the network devices. In one implementation, one or more of the network devices has one or more of increased flexibility, increased efficiency, or reduced processing times because the functions of the transportation system are distributed among the network devices. In one implementation, client computing devices 120A-120Z and vehicle computing devices 150A-150Z have faster search times (e.g., pickup location, drop-off location, segment on a predetermined line, etc.) because the predetermined lines and segments thereof are determined and stored previous to the searches in one or more of transportation server 110, data store 130, or map data server 160. In one implementation, one or more of the network devices prefetch data (e.g., transfer data from main memory to temporary storage in readiness for later use) based on user history, common requests, and so forth to provide faster search times, increased efficiency, reduced bandwidth latency, and so forth.

In some implementations, the predetermined route component 200 may be implemented on a different device than transportation server 110. For example, in some implementations, one or more of the client computing devices 120A-120Z may implement the predetermined route component 200 (or at least some of the functionality of the predetermined route component 200). In some implementations, some or all of the functionality of the predetermined route component 200 may be distributed across one or more of the client computing devices 120A-120Z and/or one or more of the vehicle computing devices 150A-150Z. In some implementations, the transportation server 110 may be omitted from the system architecture 100. In some implementations, more than one transportation server 110 may be included in the system architecture 100.

In one implementation, the map data server 160 includes map data for a variety of locations (e.g., city maps), as well as real-time traffic conditions, detours (e.g., due to construction), etc. The map data server 160 may provide map data to one or more devices within the system architecture 100 via the network 105. In some implementations, the transportation server 110 may receive map data from the map data server 160, which may be used by the predetermined route component 200 to compute an estimated time of arrival (ETA) for a transportation vehicle to arrive at a pick-up location.

In one implementation, the data store 130 may be a memory (e.g., random access memory), a cache, a drive (e.g., a hard drive), a flash drive, a database system, or another type of component or device capable of storing data. The data store 130 may also include multiple storage components (e.g., multiple drives or multiple databases) that may also span multiple computing devices (e.g., multiple server computers), and may be cloud-based. In some implementations, the data store 130 may be a part of the transportation server 110. In some implementations, the data store 130 may be distributed among and accessible to the transportation server 110, one or more of the client computing devices 120A-120Z, one or more of the vehicle computing devices 150A-150Z, and/or the map data server 160. One or more of the devices of the system architecture 100 may utilize the data store 130 to store public and private data. The data store 130 may be configured to provide secure storage for private data.

In one implementation, the client computing devices 120A-120Z may include computing devices such as personal computers (PCs), laptops, mobile phones, smart phones, smart watches, tablet computers, netbook computers, etc. The client computing devices 120A-120Z may also be referred to as "user devices." An individual user may be associated with (e.g., own and/or use) one or more of the client computing devices 120A-120Z, and the client computing devices 120A-120Z may each be owned and utilized by different users at different locations. As used herein, a "user" may refer generally to an individual operator of one or more of the client computing devices 120A-120Z, as well as one or more of the vehicle computing devices 150A-150Z (e.g., a driver of a transportation vehicle).

In one implementation, the client computing devices 120A-120Z may each implement one of user interfaces 122A-122Z, respectively. Each of user interfaces 122A-122Z may allow a user of the respective client computing device 120A-120Z to send/receive information to/from the transportation server 110, the data store 130, any of the vehicle computing devices 150A-150Z, and the map data server 160. For example, one or more of the user interfaces 122A-122Z may be a web browser interface that can access, retrieve, present, and/or navigate content (e.g., web pages such as Hyper Text Markup Language (HTML) pages) provided by the transportation server 110. In one implementation, one or more of the user interfaces 122A-122Z may be a standalone transportation application (e.g., a mobile app), which may have been provided by the transportation server 110 (e.g., as a downloadable application to be installed by an administrator). The user interfaces 122A-122Z may allow for the client computing device 120A-120Z to send/receive information to/from the transportation server 110. In some implementations, one or more of the client computing devices 120A-120Z may be associated with an account number that identifies the client computing devices 120A-120Z to the transportation server 110. In some implementations, the user interfaces 122A-122Z may allow their respective client computing devices 120A-120Z to interact directly with the transportation server 110. In some implementations, a user interface 122A-122Z (e.g., implemented as a transportation application) may be initiated on a respective client computing device 120A-120Z in response to the respective client computing device 120A-120Z being placed in proximity of a predetermined route.

In some implementations, in addition to allowing users of client computing devices 120A-120Z to place order requests, the transportation application may also allow a user to pay for a ride or a trip, monitor the locations of different transportation vehicles, select a transportation vehicle, provide feedback on drivers and/or transportation vehicles (e.g., rate a driver), etc. The transportation application may also provide a variety of information to the user such as, but not limited to, estimated time of arrival (ETA) of the transportation vehicle, information about the driver of the transportation vehicle (such as driver name/phone number), information about the transportation vehicle (e.g., type of vehicle, make, model, year, etc.), updates about whether a driver will late or has arrived and is waiting, and whether a ride has been completed (e.g., whether the transportation vehicle has arrived at the pick-up location specified by the user). The user interfaces 122A-122Z and their functionality are described in greater detail with respect to FIGS. 4A-4I.

In one implementation, the vehicle computing devices 150A-150Z may be computing devices (e.g., "driver boxes") that are located on-board transportation vehicles (e.g., as built-in computing devices or separate/portable devices operated by drivers of the transportation vehicles). The vehicle computing devices 150A-150Z may include computing devices such as personal computers (PCs), laptops, mobile phones, smart phones, tablet computers, netbook computers, etc. The vehicle computing devices 150A-150Z may have some or all of the functionality of each of the client computing devices 120A-120Z, and may be configured to exchange data with each other as well as with the transportation server 110, the client computing devices 120A-120Z, the data store 130, and the map data server 160. The vehicle computing devices 150A-150Z may be located aboard any suitable transportation vehicle, such as a taxi, a car, a truck, a van, a limousine, a sport utility vehicle, etc., that may be used to transport users between locations.

A driver operating one of vehicle computing devices 150A-150Z may receive order requests, accept order requests, decline order requests, and/or transfer order requests to other drivers (e.g., other drivers operating vehicle computing devices 150A-150Z). In one implementation, the vehicle computing devices 150A-150Z may include GPS tracking devices for tracking locations of their respective transportation vehicles. Location data generated by the GPS tracking devices may be transmitted to the transportation server 110 and utilized, for example, to compute estimate times of arrival.

In one implementation, the transportation server may include a database (e.g., stored in the data store 130) that includes drop off locations (e.g., designated locations for dropping off a passenger) associated with one or more user histories corresponding to client computing devices 120A-120Z. For example, when the transportation server 110 receives an order request (e.g., from client computing device 120A) for a transportation vehicle, the transportation server 110 may determine a drop off location based on an identifier (e.g., a serial number, an alpha-numeric identifier, a numeric identifier, etc.) included in the order request, with the identifier corresponding to a user history of the client computing device 120A. Each of the user histories may have associated identifiers such as unique serial numbers. The determined drop off location may be automatically-transmitted to one or more vehicle computing devices 150A-150Z of transportation vehicles.

In some implementations, a pick-up location may correspond to a geographical location (e.g., the physical location) of the client computing device 120A-120Z. In some implementations, one or more of the client computing devices 120A-120Z may include global positioning system (GPS) tracking devices, which can determine locations of the client computing devices 120A-120Z. In some implementations, one or more of the client computing devices 120A-120Z may be portable, and location information may be transmitted directly to the transportation server 110 from the one or more client computing devices 120A-120Z upon arriving at a new location, or may be transmitted by the client computing devices 120A-120Z in the location information in the form of the order request. In some implementations, a predetermined route may be associated with two or more pick-up locations and two or more drop-off locations, and a user of one of the client computing devices 120A-120Z may select a desired pick-up location and drop-off location from the available pick-up locations (e.g., using a respective user interface 122A-122Z).

Figure 2:
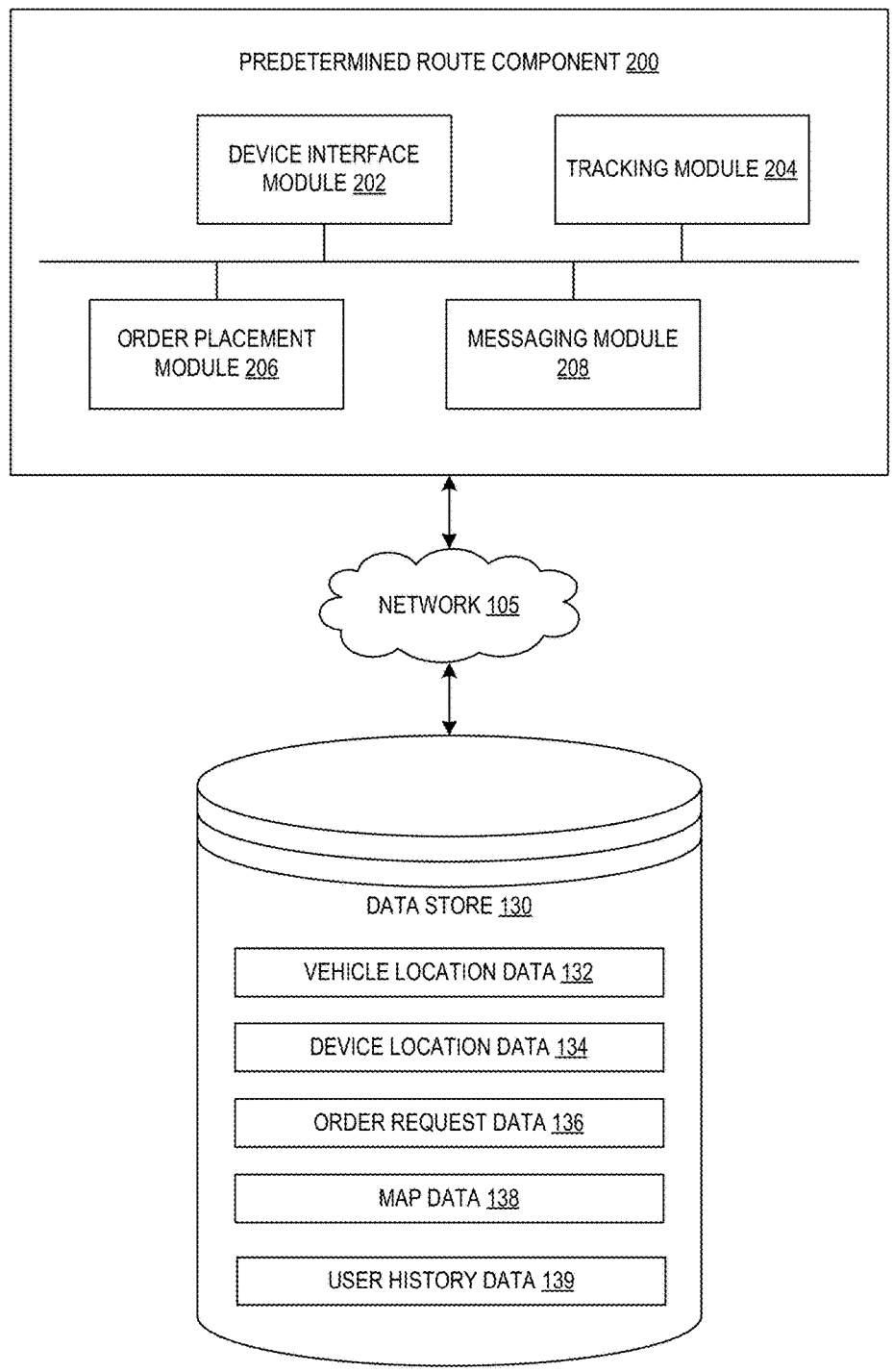
FIG. 2 is a block diagram illustrating features of a predetermined route component according to an implementation of the disclosure.

FIG. 2 is a block diagram illustrating features of a predetermined route component 200 in accordance with an implementation of the disclosure. The predetermined route component 200 may be the same as the predetermined route component 200 of FIG. 1. In one implementation, the predetermined route component 200 includes a device interface module 202, a tracking module 204, an order placement module 206, and a messaging module 208. More or less components may be included in the predetermined route component 200 without loss of generality. For example, two or more of the modules may be combined into a single module, or one of the modules may be divided into two or more modules.

In one implementation, one or more of the modules may reside on different computing devices. For illustrative purposes, the predetermined route component 200 is described as being implemented by the transportation server 110, but it may be implemented at least partially by any of the client computing devices 120A-120Z, any of the vehicle computing devices 150A-150Z, and/or the map data server 160. For example, a client computing device (e.g., client computing device 120A) may be programmed to perform some or all of the functions of the predetermined route component 200. When the predetermined route component 200 is implemented on a device other than the transportation server 110, any functions described with respect to the predetermined route component 200 that "establish," "receive," "transmit," "determine," "access," etc., may refer to functions performed by sub-systems or sub-modules within the implementing device rather than across a network (e.g., the network 105), as would be appreciated by one of ordinary skill in the art.

In one implementation, the device interface module 202 is utilized by the predetermined route component 200 to exchange data between one or more devices (e.g., one or more devices of the system architecture 100). In one implementation, the device interface module 202 may exchange message data between transportation vehicles (e.g., between vehicle computing devices 150A-150Z), and may store vehicle location data 132 in the data store 130. In one implementation, the device interface module 202 may maintain device location data 134 (e.g., location data of the client computing devices 120A-120Z), and update the device location data 134 to include newly-added client computing devices and updated locations for current client computing devices. In one implementation, the device interface module 202 may process order request data 136 received from client computing devices (e.g., the client computing devices 120A-120Z), which may be stored in the data store 130. In one implementation, the device interface module 202 may receive and store map data 138 (which may be received from the map data server 160).

In one implementation, the tracking module 204 is utilized by the predetermined route component 200 to track the locations of transportation vehicles (e.g., based on location data received from the vehicle computing devices 150A-150Z). In one implementation, in response to the device interface module 202 receiving an order request, the tracking module 204 may identify the closest vehicles to the designated pick-up location within a pre-defined range (e.g., a 1 mile radius, a 5 mile radius, etc.). The pre-defined range may be configured by an administrator of a system of the predetermined route component 200.

In one implementation, the tracking module 204 may receive updated location data periodically from each of the plurality of vehicle computing devices 150A-150Z, which may be used to determine current location, driving direction, and estimated time of arrival at a designated pick-up location. In one implementation, an estimated time of arrival for a transportation vehicle may be computed based on any of the current location of the transportation vehicle, a current speed of the transportation vehicle, a current direction of travel of the transportation vehicle, an average speed of the transportation vehicle, an optimized route for traveling from the current location to a pick-up location, speed limits along the optimized route, or current traffic conditions.

In one implementation, the order placement module 206 may be utilized by the predetermined route component 200 to transmit order requests to one or more of the vehicle computing devices 150A-150Z of transportation vehicles. In one implementation, the order placement module 206 may transmit an order request to one or more of the vehicle computing devices 150A-150Z within a pre-defined range of client computing device from which the order request was received. In one implementation, the order placement module 206 may transmit the order request to one or more of the vehicle computing devices corresponding to one or more user-selected transportation vehicles (e.g., using one of the user interfaces 122A-122Z). For example, the user may prefer a particular make/model of transportation vehicle or a particular driver, and may make indicate the preference when placing the order request.

In one implementation, a user may be assigned a transportation vehicle in response to receiving a response from a vehicle computing device of the transportation vehicle indicating acceptance of the order request. After assigning the transportation vehicle, location information associated with the transportation vehicle may be transmitted periodically (e.g., from the transportation server 110) to the client computing device of the user.

In one implementation, the messaging module 208 may be utilized by the predetermined route component 200 to transmit order-related updates to one or more of the client computing devices 120A-120Z. The messages may include any type of electronic communication messages, such as short message service (SMS) messages, e-mails, text messages, etc. to a client computing device of the user that placed an order request.

Figure 3A:
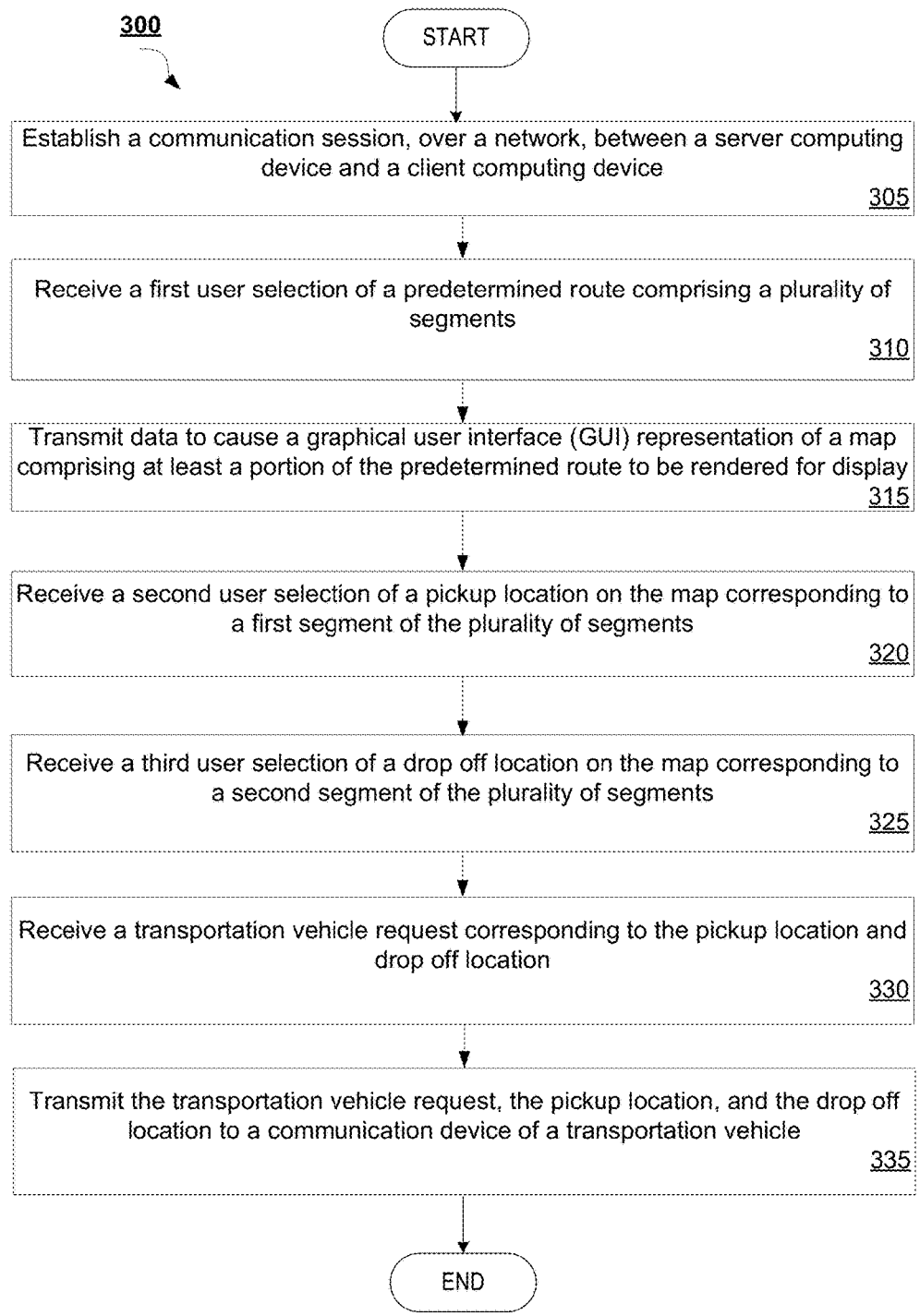
FIG. 3A is a flow diagram illustrating a method for selecting pickup and drop off locations along a predetermined route according to an implementation of the disclosure.

FIG. 3A is a flow diagram illustrating a method 300 for marking pickup and drop off locations on a predetermined route according to an implementation of the disclosure. The method 300 may be performed by processing logic that includes hardware (e.g., circuitry, dedicated logic, programmable logic, microcode, etc.), software (e.g., instructions run on a processing device to perform hardware simulation), or a combination thereof. In one implementation, the method 300 may be performed by a processing device of transportation server 110. In other implementations, other devices may perform method 300 (e.g., one or more devices of the system architecture 100).

Referring to FIG. 3A, the method 300 begins at block 305 where processing logic establishes a communication session, over a network, between a server computing device (e.g., transportation server 110) and a client computing device (e.g., client computing device 120A).

At block 310, the processing logic receives, via the communication session from the client computing device (e.g., client computing device 120A), a first user selection of a predetermined route including a plurality of segments, where each of the plurality of segments corresponds to a geographical location along the predetermined route. Each geographic location along the predetermined route may be where one or more transportation vehicles are allowed to pick up or drop off users.

At block 315, the processing logic transmits, by the processing device to the client computing device (e.g., client computing device 120A), data to cause a graphical user interface (GUI) representation of a map including at least a portion of the predetermined route to be rendered for display via a device interface of the client computing device (e.g., client computing device 120A). An exemplary user interface for the transportation application is described in detail with respect to FIGS. 4A-4I. In one embodiment, the processing logic receives, via the communication session, a device location of the client computing device (e.g., client computing device 120A) and determines the predetermined route is most proximate to the device location out of one or more predetermined routes. In one implementation, the transmitting of the data to cause the GUI representation of the map comprising the at least a portion of the predetermined route to be rendered (e.g., block 315) is subsequent to the determining the predetermined route is the most proximate and prior to the receiving of the first user selection.

At block 320, the processing logic receives, via the communication session from the client computing device, a second user selection of a pickup location on the map corresponding to a first segment of the plurality of segments. In one embodiment, the processing logic receives, via the communication session, a device location of the client computing device (e.g., client computing device 120A). The processing device determines the first segment is most proximate to the device location out of the plurality of segments. The processing device further transmits, to the client computing device (e.g., client computing device 120A), data to cause the GUI representation of the map to further include a first object and a second object to be rendered for display via the device interface of the client computing device, where the first object corresponds to the device location and the second object corresponds to the first segment, the second object includes the pickup location.

In one embodiment, the GUI representation of the map is to display a first object at a proposed pickup location corresponding to a third segment of the plurality of segments. The GUI representation of the map is further to receive a map drag input, and relocate the first object to a new location on the GUI representation of the map in response to receiving the map drag input. GUI representation of the map is further to snap the first object to the first segment subsequent to receiving the map drag input, where the first segment is most proximate to the new location out of the plurality of segments. The map drag input may refer to one or more of swiping a finger along the GUI representation of the computing device, clicking and dragging (e.g., with a mouse, with a stylus, with a finger, on an icon on the GUI representation, etc.), a scroll bar, a scroll pane, buttons in the map region 410, and so forth.

At block 325, the processing logic receives, via the communication session from the client computing device, a third user selection of a drop off location on the map corresponding to a second segment of the plurality of segments. In one embodiment, prior to receiving the third user selection of the drop off location, the processing device accesses user history corresponding to the client computing device and determines the second segment corresponds to a previous drop off location in the accessed user history. The processing device, in response to the determining the second segment corresponds to the previous drop off location, transmits, to the client computing device (e.g., client computing device 120A), data to cause the GUI representation of the map to further include a third object to be rendered for display via the device interface of the client computing device, where the third object corresponds to the second segment and the third object includes a proposed drop off location.

In one embodiment, the GUI representation of the map is to display a second object at a proposed drop off location corresponding to a fourth segment of the plurality of segments and receive a map drag input to drag the map to a new location. The GUI representation of the map is further to relocate the second object to the new location on the GUI representation of the map in response to receiving the map drag input and snap the second object to the second segment subsequent to the receiving the map drag input, wherein the second segment is most proximate to the new location out of the plurality of segments.

At block 330, the processing logic receives, via the communication session from the client computing device, a transportation vehicle request corresponding to the pickup location and the drop off location.

At block 335, the processing logic transmits the transportation vehicle request, the pickup location, and the drop off location to a communication device of a transportation vehicle (e.g., vehicle computing device 150A).

Figure 3B:
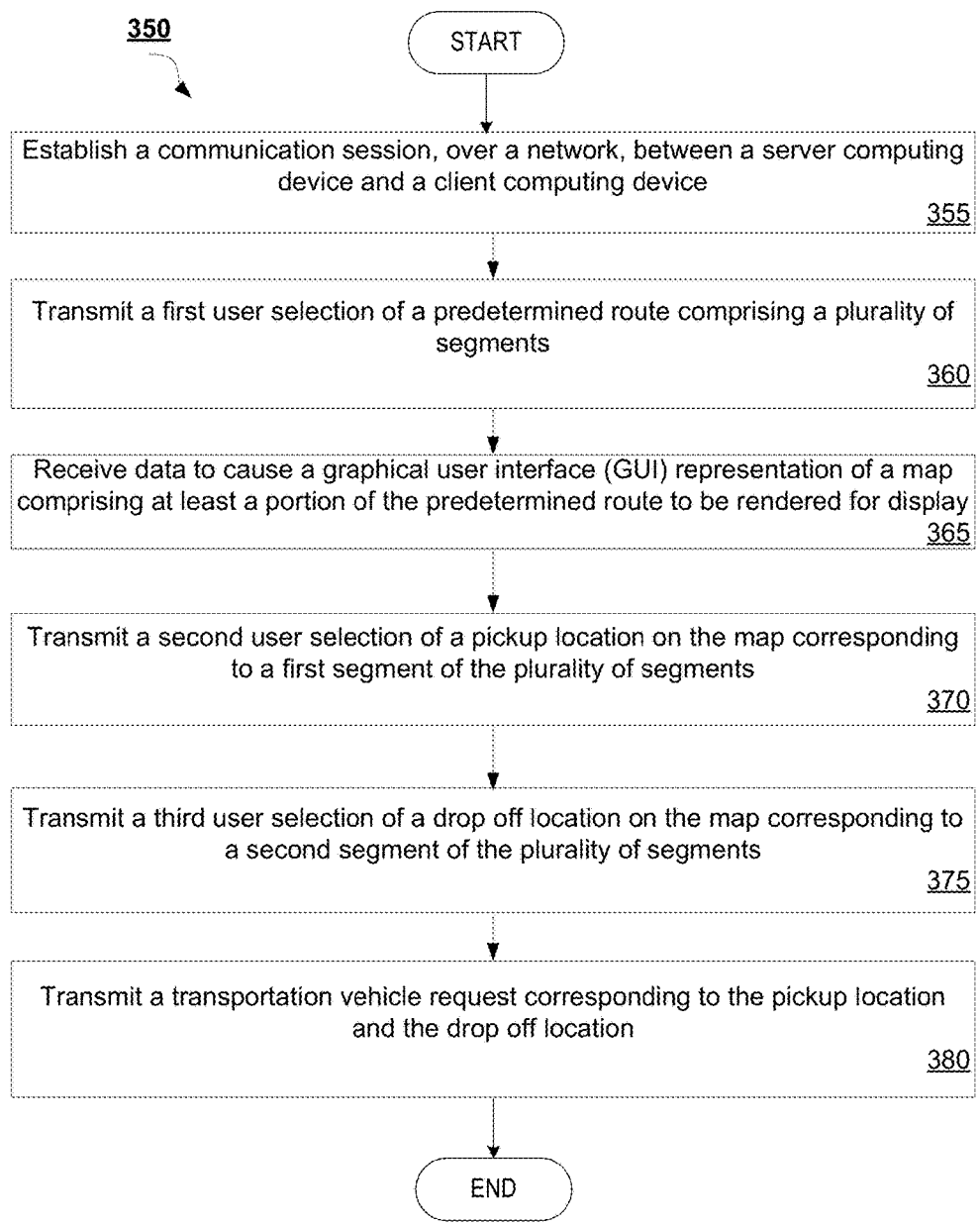
FIG. 3B is a flow diagram illustrating a method for selecting pickup and drop off locations along a predetermined route according to another implementation of the disclosure.

FIG. 3B is a flow diagram illustrating a method 350 for dragging and dropping a map for marking pickup and drop off locations on a predetermined route according to an implementation of the disclosure. The method 350 may be performed by processing logic that includes hardware (e.g., circuitry, dedicated logic, programmable logic, microcode, etc.), software (e.g., instructions run on a processing device to perform hardware simulation), or a combination thereof. In one implementation, the method 350 may be performed by a processing device of one of the client computing devices 120A-120Z. In other implementations, other devices may perform method 350 (e.g., one or more devices of the system architecture 100).

Referring to FIG. 3B, the method 350 begins at block 355 where processing logic establishes a communication session, over a network, between the client computing device (e.g., client computing device 120A) and a server computing device (e.g., transportation server 110).

At block 360, the processing logic transmits, via the communication session to the server computing device (e.g., transportation server 110), a first user selection of a predetermined route including a plurality of segments, where each of the plurality of segments corresponds to a geographical location along the predetermined route. Each geographic location along the predetermined route may be where one or more transportation vehicles are allowed to pick up or drop off users At block 365, the processing logic receives, via the communication session from the server computing device, data to cause a graphical user interface (GUI) representation of a map including at least a portion of the predetermined route to be rendered for display via a device interface of the client computing device (e.g., client computing device 120A). An exemplary user interface for the transportation application is described in detail with respect to FIGS. 4A-4I. In one embodiment, the processing logic transmits, via the communication session to the server computing device (e.g., transportation server 110), a device location of the client computing device (e.g., client computing device 120A). The processing logic may receive the data to cause the GUI representation of the map comprising the at least a portion of the predetermined route to be rendered subsequent to the server computing device (e.g., transportation server 110) determining the predetermined route is the most proximate to the device location out of one or more predetermined routes and prior to the processing logic transmitting the first user selection.

At block 370, the processing logic transmits, via the communication session to the server computing device (e.g., transportation server 110), a second user selection of a pickup location on the map corresponding to a first segment of the plurality of segments. In one embodiment, the processing device transmits, via the communication session to the server computing device, a device location of the client computing device. The server computing device to determine the first segment is most proximate to the device location out of the plurality of segments. The processing logic receives, from the server computing device, data to cause the GUI representation of the map to further comprise a first object and a second object to be rendered for display via the device interface of the client computing device. The first object corresponds to the device location and the second object corresponds to the first segment, the second object including a proposed pickup location.

In one embodiment, the GUI representation of the map displays a first object at a proposed pickup location corresponding to a third segment of the plurality of segments and receives a map drag input. The map drag input may refer to one or more of swiping a finger along the GUI representation of the computing device, clicking and dragging (e.g., with a mouse, with a stylus, with a finger, on an icon on the GUI representation, etc.), a scroll bar, a scroll pane, buttons in the map region 410, and so forth. The GUI representation of the map relocates the first object to a new location on the GUI representation of the map in response to receiving the map drag input and snaps the first object to the first segment subsequent to receiving the map drag input, wherein the first segment is most proximate to the new location out of the plurality of segments.

At block 375, the processing logic transmits, via the communication session to the server computing device (e.g., transportation server 110), a third user selection of a drop off location on the map corresponding to a second segment of the plurality of segments.

In one embodiment, the GUI representation of the map displays a second object at a proposed drop off location corresponding to a fourth segment of the plurality of segments and receives a map drag input to drag the map to a new location. The GUI representation of the map relocates the second object to the new location on the GUI representation of the map in response to receiving the map drag input and snaps the second object to the second segment subsequent to the receiving the map drag input, wherein the second segment is most proximate to the new location out of the plurality of segments.

At block 380, the processing logic transmits, via the communication session to the server computing device (e.g., transportation server 110), a transportation vehicle request corresponding to the pickup location and the drop off location. The server computing device (e.g., transportation server 110) is to transmit (e.g., by the order placement module 206 of the predetermined route component 200) the transportation vehicle request, the pickup location, and the drop off location to communication devices (e.g., vehicle computing devices 150A-150Z) of one or more transportation vehicles. One of the transportation vehicles may accept the order request, and the accepting transportation vehicle may be designated as the transportation vehicle to pick up the user at the pick-up location.

In some implementations, the order request is transmitted by the client computing device. In some implementations, a response is received from the transportation server indicating acceptance of the order request. The client computing device may then present for display a graphical representation of a relationship between a pick-up location and a location of the transportation vehicle, as well as other data related to the transportation vehicle (e.g., driver name, estimated time of arrival, vehicle make/model, etc.). Order flow may continue after block 380 using the client computing device, which is illustrated via graphical user interface (GUI) windows in FIGS. 4A-41I.

Reference is now made to FIGS. 4A-41I, which illustrate exemplary GUI windows presented for display by an exemplary transportation application.

Figure 4A:
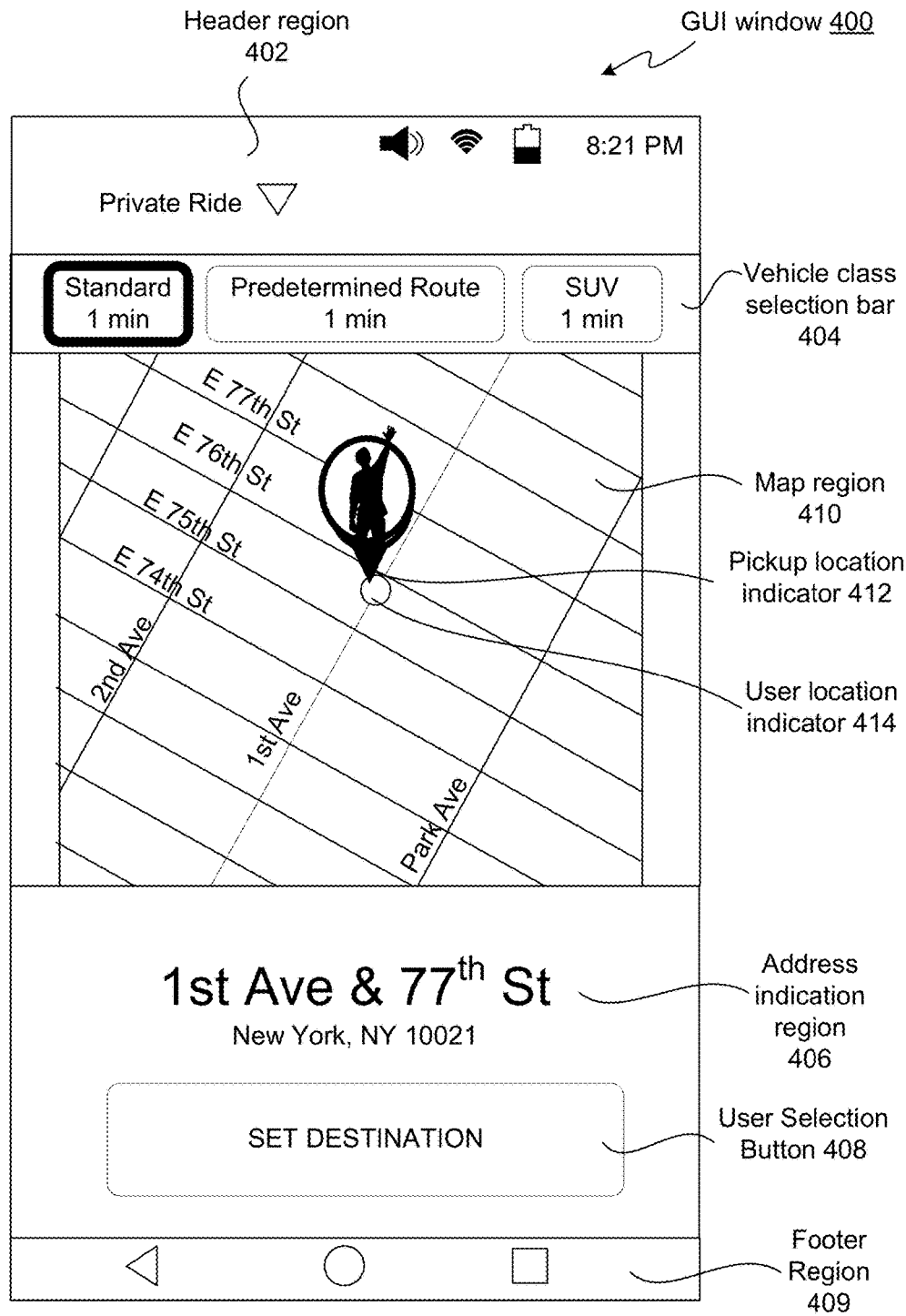
FIG. 4A illustrates an exemplary graphical user interface (GUI) window for selecting a transportation vehicle class according to an implementation of the disclosure.

FIG. 4A illustrates an exemplary GUI window 400 (e.g., of a transportation application) for selecting a transportation vehicle class according to an implementation of the disclosure. In some implementations, the GUI window 400 and similar GUI windows described herein are implemented by a user interface (e.g., user interface 122A) of a client computing device (e.g., client computing device 120A) as an executed transportation application.

As illustrated in FIG. 4A, a GUI window 400 may be presented for display by the client computing device 120A (e.g., a transportation application executed by the client computing device 120A).

The GUI window 400 includes a header region 402, a vehicle class selection bar 404, a map region 410, an address indication region 406, a user selection button 408, and a footer region 409.

Header region 402 may include a drop-down menu that includes one or more options (e.g., private ride, shared ride, etc.). In GUI window 400, private ride is selected. In some implementations, if the GUI window 400 is implemented on a client computing device, such as a mobile device, device information (e.g., volume, internet connection, battery capacity, current time) may be included in header region 402. In other implementations, such as if the GUI window 400 is implemented on a different device (a device other than a mobile device), the device information may be omitted or may be different. Header region 402 may display order-related messages.

The vehicle class selection bar 404 may display one or more vehicle classes from which a user may choose. Vehicle classes may include one or more of standard (e.g., to send a transportation request to a basic private car), predetermined route (e.g., to send a transportation request with pickup and drop off locations chosen from a plurality of segments along a predetermined route as described herein), SUV (e.g., to send a transportation request to a sport utility vehicle), premium (e.g., to send a transportation request to a luxury vehicle), deal (e.g., to send a transportation request for a discounted area (e.g., $10 rides anywhere in Manhattan below 110th Street)), etc. The vehicle class selection bar 404 may display additional information (e.g., wait time, average cost, an icon representing the vehicle class, and so forth) for the one or more vehicle classes.

In response to the standard class being selected in vehicle class selection bar 404, the map region 410 provides a map of the geographical area around the location of the client computing device 120A. The map region 410 depicts one or more of a pickup location indicator 412 or a user location indicator 414 which correspond to a location of the user (e.g., of the client computing device 120A) or a suitable pick-up location near the client computing device 120A.

An address indication region 406 may display an address or location of the client computing device 120A. In GUI window 400, the address indication region 406 displays the address (e.g., 1st Ave & 77th St, New York, N.Y. 10021) of the pickup location which corresponds with the user location indicator 414 and pickup location indicator 412.

In one embodiment, the user may input a pickup location that does not correspond to the device location of the client computing device 120A. The user may input a pickup location by one or more of inserting an address, making a selection on the map region 410, dragging the map region 402 to a new location, selecting a previously used drop off location, etc.

The user selection button 408 may allow the user to make a selection corresponding to the information on the GUI window 400 and the information displayed in the user selection button 408. In the GUI window 400, standard class is selected in vehicle class selection bar, a current location is displayed on map region 410 and address indication region 406, and the user selection button 408 displays "set destination." In response to user selection of the user selection button 408 of GUI window 400, the current location and standard class will be used as inputs in a transportation request. In response to selecting the user selection button 408, the user may input the drop off location (e.g., insert an address, make a selection on the map region 402, drag the map region 402 to a new location, select a previously used drop off location, and so forth).

The footer region 409 may display one or more additional indicators or buttons (e.g., a circle for a home button (e.g., go to the home screen of the device interface), a triangle for a back button (e.g., go to the previous page on the application or quit the application), a square for a recents button (e.g., show the applications that were most recently used), and so forth). In some implementations, if the GUI window 400 is implemented on a client computing device 120A, such as a mobile device, a footer region 409 may be included. In other implementations, such as if the GUI window 400 is implemented on a different device (a device other than a mobile device), the footer region may be omitted.

Figure 4B:
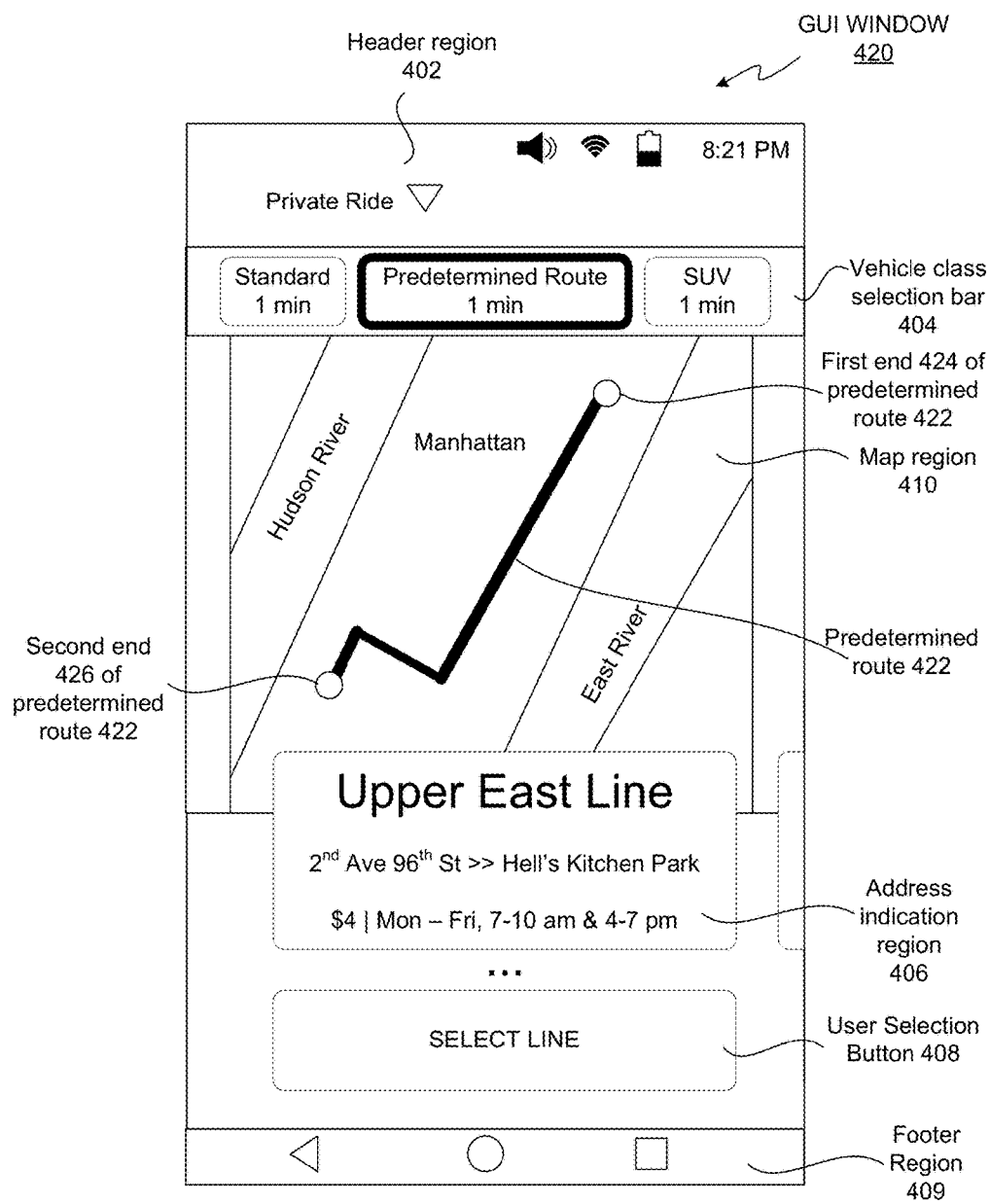
FIG. 4B illustrates an exemplary GUI window for selecting a predetermined route according to an implementation of the disclosure.

FIG. 4B illustrates an exemplary GUI window 420 for selecting a predetermined route according to an implementation of the disclosure. The GUI window 420 may be displayed upon selection of "predetermined route" in the vehicle class selection bar 404. In one embodiment, the predetermined route shown in GUI window 420 (e.g., upon selection of "predetermined route" in the vehicle class selection bar 404) is the predetermined route in closest proximity to the device location of the client computing device 120A. In another embodiment, the predetermined route shown in GUI window 420 is the predetermined route that the user has most recently used. In another embodiment, the predetermined route shown in GUI window 420 is the predetermined route that the user has used the most within a preceding amount of time (e.g., over the past year, over the past month, over the past week, over the entire user history). In another embodiment, the predetermined route shown in GUI window 420 is the predetermined route that is most used by users. In another embodiment, the predetermined routes accessible by GUI window 420 are predetermined routes that are currently operating during the time that GUI window 420 is accessed.

The address indication region 406 displays predetermined route information including one or more of predetermined route name (e.g., Upper East Line), a first end of the predetermined route (e.g., 2$^{nd}$ Ave 96$^{th}$ St), a second end of the predetermined route (e.g., Hell's Kitchen Park), price (e.g., $4), days and times the predetermined route is operating (e.g., Monday through Friday from 7 am to 10 am and 4 pm to 7 pm), etc. In response to user input (e.g., swiping to the left or right in the address indication region, etc.), a different predetermined route may be displayed. In one embodiment, each of the plurality of predetermined routes that may be displayed by a user input (e.g., swiping on the address indication region 406) is currently operating at the time that the GUI window 420 is accessed.

In the GUI window 420, the map region 410 displays one or more of a graphical representation of the predetermined route 422 (e.g., a route south on 2$^{nd}$ Ave from E 96$^{th}$ to E 57$^{th}$ St, west on 57$^{th}$ St from 2$^{nd}$ Ave to 9$^{th}$ Ave, south on 9$^{th}$ Ave from W 57$^{th}$ St to W 49$^{th}$ St, and west on W 49$^{th}$ St to Hell's Kitchen Park; the predetermined route displayed in the address indication region 406), a first end 424 of the predetermined route 422 (e.g., 2$^{nd}$ Ave & E 96$^{th}$ St), or a second end 426 of the predetermined route 422 e.g., Hell's Kitchen Park). The first end 424 may be a starting location and the second end 426 may be an ending location of the predetermined route 422. In one embodiment, the map region 410 shows a zoomed out view of the entire predetermined route 422. In another embodiment, the map region 410 displays one or more of the pickup location indicator 412 or user location indicator 414.

In one embodiment, there is one predetermined route 422 per direction (e.g., a first predetermined route 422 from first end 424 to second end 426, a second predetermined route 422 from second end 426 to first end 424) that may be displayed by a user input (e.g., swiping on the address indication region 406). In another embodiment, the GUI window receives a user input of the direction the user is travelling on the predetermined line 422. In another embodiment, the direction is determined by the user input of a drop-off location subsequent to user input of a pickup location.

In the GUI window 420, the user selection button 408 displays "select line." Upon selection of the user selection button 408, the predetermined route 422 displayed in the address indication region 406 and map region 410 will be selected.

Figure 4C:
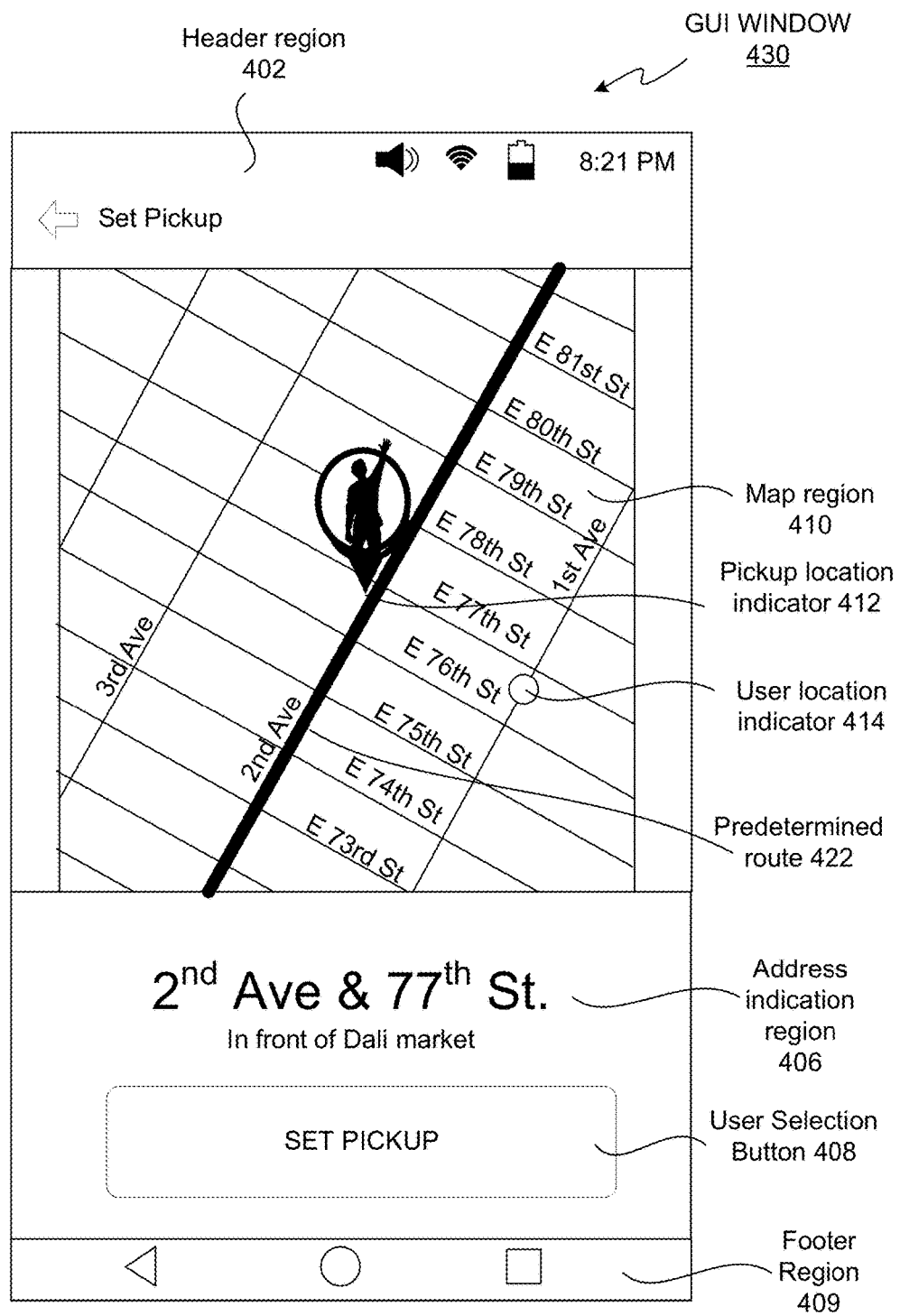
FIG. 4C illustrates an exemplary GUI window for selecting a pickup location on the predetermined route according to an implementation of the disclosure.

FIG. 4C illustrates an exemplary GUI window 430 for selecting a pickup location on the predetermined route 422 according to an implementation of the disclosure. The GUI window 430 may be displayed upon selection of the user selection button 408 in FIG. 4B to select a predetermined route. The header region 402 may display an order-related message of "set pickup" and an arrow to return to the previous GUI window (e.g., GUI window 420).

In GUI window 430, the map region 410 displays the predetermined route 422, the user location indicator 414, and the pickup location indicator 412. The predetermined route 422 may include a plurality of segments. In one embodiment, each segment of the predetermined route 422 has a segment distance (e.g., 1 ft, 5 ft, 10 ft, 20 ft, 50 ft, 100 ft, etc.) of the predetermined route. For example, if a predetermined route 422 has a total southbound distance of 19,536 ft, and if the segment distance is 10 ft, the southbound predetermined route 422 includes 1,954 segments. In another embodiment, each block (e.g., E 77$^{th}$ St to E 76$^{th}$ St on 2$^{nd}$ Ave) is split into a fixed number of segments (e.g., four segments, eight segments, sixteen segments, thirty-two segments, etc.). For example, if southbound on predetermined route 422 is 54 blocks and if each block is split into thirty-two segments, southbound predetermined route 422 includes 1,728 segments. In another embodiment, the predetermined route 422 includes a segment only where a user can be picked up and dropped off (e.g., not in construction area, not where stopping is prohibited). In another embodiment, the predetermined route 422 includes a first set of pickup segments and a second set of drop off segments. In one embodiment, each pickup segment may correspond to a drop off location. In another embodiment, each pickup segment may not have a corresponding drop off segment. The pickup segments and drop off segments may be determined independent of each other. For example, there may be location on the predetermined route that allow drop-offs but do not allow pickups. In another example, a limited amount of segments may help reduce costs for the transportation system, the drivers, and the users. If there is one pickup location per block over the 54 blocks of predetermined route 422 and one drop off location per block over the 54 blocks of predetermined route 422, cost savings offered to users may make it worth it to the users to walk further to reach the pickup location and walk further from the drop off location to reach their destination.

In one embodiment, the plurality of segments of predetermined route 422 may include a first set of locations on a first side of each street of the predetermined route 422 (e.g., west side of 2$^{nd}$ Ave) and a second set of segments for a second side of each street of the predetermined route 422 (e.g., east side of 2$^{nd}$ Ave). In one embodiment, the server computing device may determine which side of the street to pick up the user. In another embodiment, the server computing device indicates to the user what side of the street at which the user will be picked up. In another embodiment, the user inputs on which side of the street the user will be picked up.

The server computing device (e.g., transportation server 110) may identify a first segment of predetermined route 422 that corresponds to the device location (e.g., corresponding to user location indicator 414) of the client computing device 120A. The server computing device (e.g., transportation server 110) may cause a GUI representation of a map (e.g., map region 410) to display a pickup location indicator 412 corresponding to the first segment. In one embodiment, the first segment may be a segment on the predetermined route 422 with the shortest walking distance from the device location. In another embodiment, the first segment may be a segment on the predetermined route 422 with the shortest walking time from the device location. In another embodiment, the first segment may be a segment on the predetermined route 422 with a shorter waiting time out of the segments with the same walking time or walking distance from the device location. The server computing device may identify the first segment in view of current construction zones, safe walking conditions (e.g., a walking route with a sidewalk), number of users waiting at the surrounding segments on the predetermined route 422, etc.

A user may choose a pickup location that corresponds to a segment that does not correspond to the device location (e.g., is not the closest segment to the device location). A portion of a map may be shown in map region 410. The map may be a map of the entire city, state, country, region, etc. The map region 410 may be zoomed in enough to show the user location indicator 414 and pickup location indicator 412 and one or more of the surrounding street names. The map region 410 may display a first portion of a map and in response to a user input, the map region 410 may display a second portion of the map. For example, the map region 410 may display a map of Manhattan with the center of the map at E 77th St and 2nd Ave. In one embodiment, a user may place a finger on a portion of the device screen corresponding to E 81st St and 2nd Ave on the map region 410 (e.g., upper right corner of map region 410 in GUI window 430) and drag (e.g., move the finger across the display screen without lifting the finger) to the center of the portion of the device screen corresponding to the center of map region 410. The map region 410 may then display a second portion of the map centered at E 81st St and 2nd Ave. In one embodiment, the map region 410 may display new portions of the map corresponding to the map dragging input during the map dragging at intervals of time (e.g., every second, every millisecond, etc.). The intervals of time may be determined by one or more of the speed of the communication session over the network between the server computing device and the client computing device 120A, speed of the client computing device 120A, or speed of the server computing device. In another device, the map region 410 may display a new portion of the map only after the map dragging is completed (e.g., after the user lifts their finger from the display screen). The map dragging input may be by one or more of swiping a finger on a display screen, clicking and dragging (e.g., with a mouse, with a stylus, with a finger, etc.), a scroll bar, a scroll pane, buttons in the map region 410, and so forth.

In one embodiment, in response to a map dragging input, a new portion of the map is displayed (e.g., the map is dragged across the map region 410) and the pickup location indicator 412 stays stationary in the map region 410. For example, the map may be dragged to display a second portion of the map on map region 410 and the pickup location indicator 412 may stay stationary in the center of the map region 410 while the map is being dragged.

In another embodiment, in response to a map dragging input, the pickup location indicator 412 is dragged from a first location on map region 410 to a second location on map region 410. In response to the map dragging input, as the pickup location indicator 412 approaches a border of the map region 410, the map region 410 may display a second portion of the map that was previously hidden. For example, if the map region 410 currently shows a first portion of a map and if a user clicks on the pickup location indicator 412 and drags the pickup location indicator 412 to the top of the map region 410 (e.g., north in the map region 410), the map region 410 may display a second portion of the map to the north of the first portion of the map.

As a result of the map dragging input, the pickup location indicator 412 may be displayed at a location that does not correspond to a segment on the predefined route 422. For example, if the map dragging input drags the map to 3rd Ave and E 77th St (e.g., a user puts their finger on 3rd Ave and E 76th St and drags their finger to the center of the map region 410), the pickup location indicator 412 will be dragged to (e.g., repositioned at) 3rd Ave and E 76th St. The server computing device determines a second segment on the predetermined route 422 that corresponds to 3rd Ave and E 76th St (e.g., shortest walking distance, shortest walking time, etc.). The server computing device transmits data to cause the GUI representation of a map (e.g., map region 410) to display the pickup location indicator 412 at the second segment. In one embodiment, the map region 410 displays a second portion of the map centered at the second segment. In another embodiment, the map region 410 relocates the pickup location indicator 412 at the second segment without adjusting the portion of the map displayed on the map region 410.

In one embodiment, the relocating of the pickup location indicator 412 from a new location not on the predetermined route to a segment on the predetermined route 422 includes snapping the pickup location indicator 412 from the new location to the segment on the predetermined route 422. In computer graphics, snapping allows an object (e.g., pickup location indicator 412) to be easily positioned in alignment with a predetermined line (predetermined route 422) by causing the object to jump (e.g., automatically) to an exact position (e.g., a segment on the predetermined route 422) when the user drags it to the proximity of the desired location (e.g., a location with a shortest distance to the segment). For example, a pickup location indicator 412 can be positioned in alignment with predetermined route 422 by the server computing device transmitting data to cause the pickup location indicator 412 to jump from a non-segment location (e.g., a location that is not a segment on the predetermined route 422) to an exact segment on the predetermined route 422 that is closest to the non-segment location.

The map region 410 may receive a plurality of map dragging inputs and may display the pickup location indicator 412 at a segment on the predetermined route 422 after each of the plurality of map dragging inputs.

The address indication region 406 displays one or more of an address corresponding to the pickup location indicator 412 (e.g., 2nd Ave & 77th St), a description of the location corresponding to the pickup location indicator 412 (e.g., in front of Dali market), etc.

The user selection button 408 may display "set pickup." Selection of the user selection button 408 will set the pickup location as the location corresponding to the pickup location indicator 412.

Figure 4D:
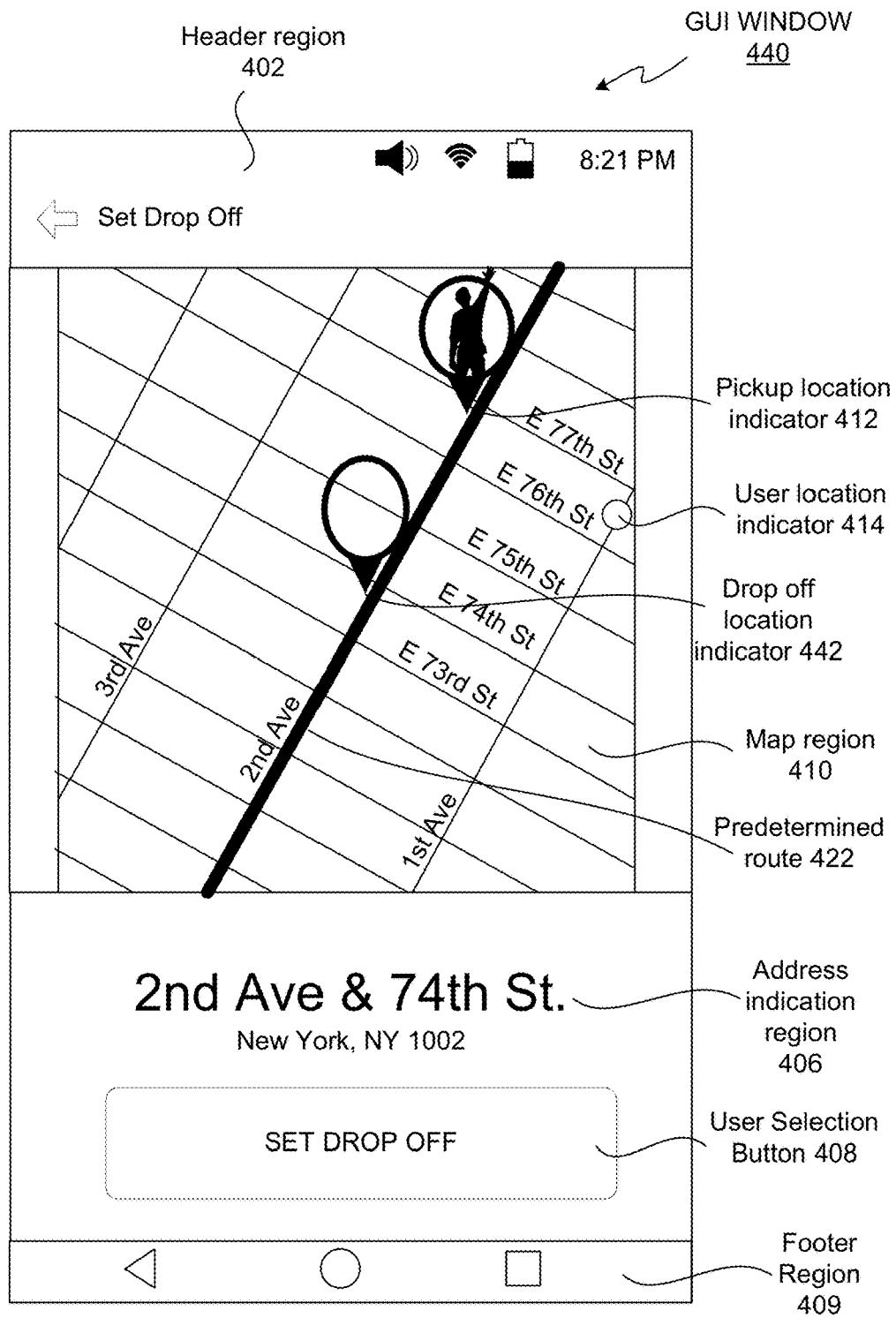
FIG. 4D illustrates an exemplary GUI window for selecting a drop off location on the predetermined route according to an implementation of the disclosure.

FIG. 4D illustrates an exemplary GUI window 440 for selecting a drop off location on the predetermined route according to an implementation of the disclosure. The GUI window 440 may be displayed in response to selection of the user selection button 408 in FIG. 4C to set the pickup location. The header region 402 may display an order-related message of "set drop off" and an arrow to return to the previous GUI window (e.g., GUI window 430).

The pickup location indicator 412 is shown at a first segment on predetermined route 422 and a drop off location indicator 442 is displayed at a second segment on predetermined route 422. In one embodiment, the second segment corresponds to the drop off location most recently used by the user (e.g., from user history). In another embodiment, the second segment corresponds to the drop off location used most often by the user (e.g., from user history). In another embodiment, the second segment corresponds to a distance (e.g., one mile, four blocks, etc.) from the first segment. In another embodiment, the second segment corresponds to a location most often used by users of the predetermined route 422.

A map dragging input (e.g., as described in the description of FIG. 4C) may be performed to move the drop off location indicator 442 to a third segment on the predetermined route.

The map region 410 may receive a plurality of map dragging inputs and may display the drop off location indicator 442 at a segment on the predetermined route 422 after each of the plurality of map dragging inputs.

The address indication region 406 displays one or more of an address corresponding to the drop off location indicator 442 (e.g., 2nd Ave & 74th St, New York, N.Y. 1002), a description of the location corresponding to the drop off location indicator 412 (e.g., in front of Thomas Taft Salon), etc.

The user selection button 408 may display "set drop off." Selection of the user selection button 408 will set the drop off location as the location corresponding to the drop off location indicator 442.

Figure 4E:
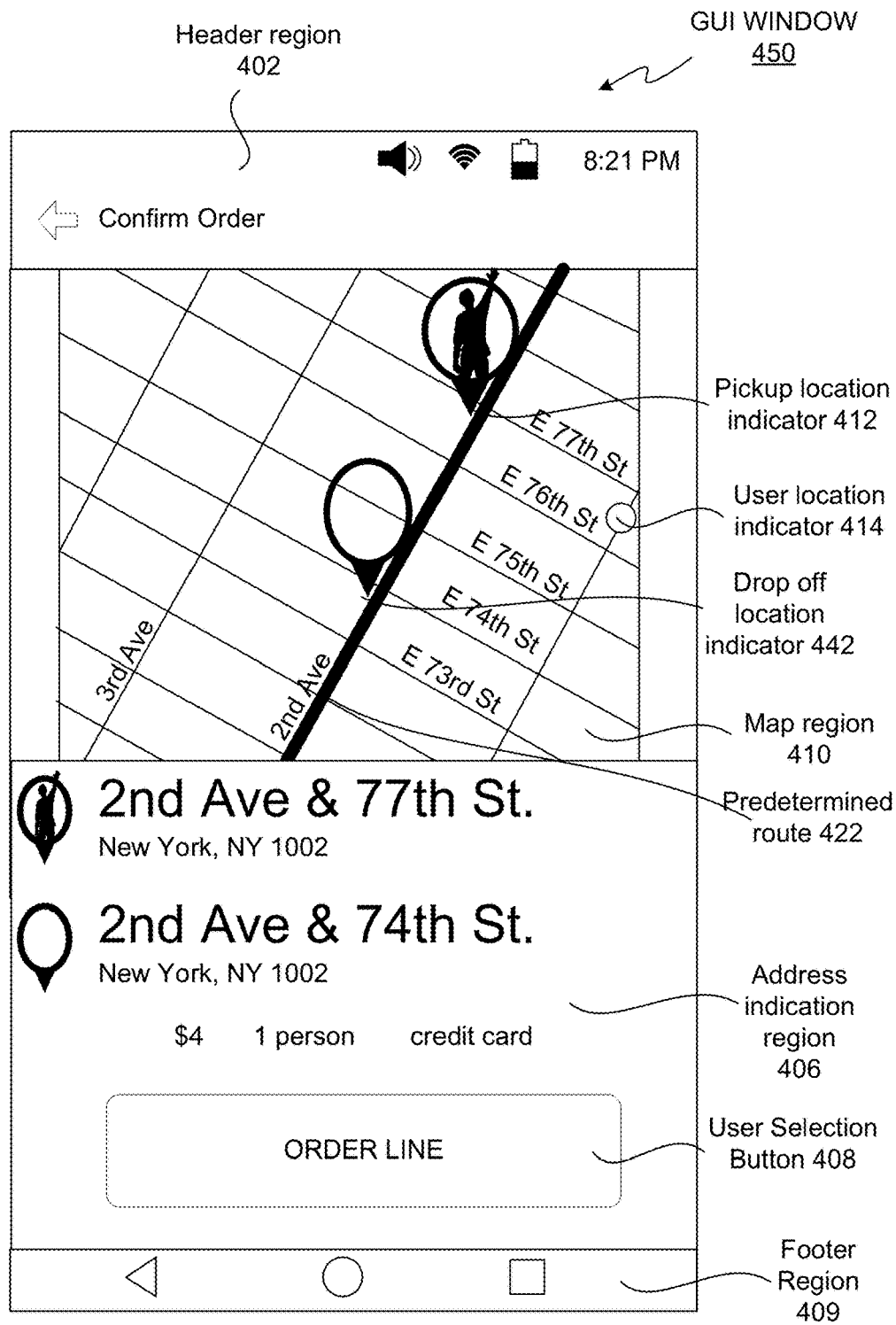
FIG. 4E illustrates an exemplary GUI window for transmitting a request for a transportation vehicle on the predetermined route according to an implementation of the disclosure.

FIG. 4E illustrates an exemplary GUI window 450 for transmitting a request for a transportation vehicle on the predetermined route 422 according to an implementation of the disclosure. The GUI window 450 may be displayed upon selection of the user selection button 408 in FIG. 4D to set the drop off location. The header region 402 may display an order-related message of "Confirm order" and an arrow to return to the previous GUI window (e.g., GUI window 440).

The map region 410 may display one or more of the pickup location indicator 412, the user location indicator 414, the drop off location indicator 442, or at least a portion of the predetermined route 422. In one embodiment, the map region 410 displays a second portion of the map that displays the entire length of the predetermined route 422. In another embodiment, the map region 410 displays the entire route from the pickup location indicator 412 to the drop off location indicator 442 along map region 410.

The address indication region 406 displays one or more of an address corresponding to the pickup location indicator 412 (e.g., $2^{nd}$ Ave & $77^{th}$ St, New York, N.Y. 1002), an address corresponding to the drop off location indicator 442 (e.g., $2^{nd}$ Ave & $74^{th}$ St, New York, N.Y. 1002), a description of the location corresponding to the pickup location indicator 412, a description of the location corresponding to the drop off location indicator 412, cost of the trip (e.g., $4), quantity of passengers (e.g., one person), the method of payment (e.g., credit card, debit card, cash, account credit, etc.)

In one embodiment, the indication of the method of payment may be a button and in response to selection of the button, a prompt may appear on the GUI window 450 prompting the user to select a previously stored form of payment (e.g., one or more credit cards that are on file in the account) or add a new form of payment (e.g., add a credit card).

In one embodiment the indication of quantity of passengers may be a button and in response to selection of the button, a prompt may appear on GUI window 450 prompting the user to select the number of passengers (e.g., one, two, three or more, etc.). In response to user selection of a number of passengers above a threshold (e.g., selection three or more passengers), the GUI window 450 may prompt a message indicating the user has exceeded the number of passengers allowed for the predetermined route class (e.g., indicating the user can order for up to two passengers in the predetermined route class) and ask if the user would like to switch to a different class from the vehicle class selection bar 404 (e.g., select standard class for three or more passengers). Upon selection of the affirmative, the GUI window 400 may be displayed. Upon selection to the contrary, the GUI window 450 may again prompt the user to select the number of passengers (e.g., one, two, three or more, etc.).

The user selection button 408 may display "order line." Selection of the user selection button 408 will transmit a transportation vehicle request corresponding to the pickup location and the drop off location. In one embodiment, the transportation vehicle request is transmitted from the client computing device 120A to the server computing device (e.g., transportation server 110) and from the server computing device to the vehicle computing devices 150A-150Z of one or more transportation vehicles. In another embodiment, the transportation vehicle request is transmitted from the client computing device to one or more vehicle communication devices 150A-150Z.

Figure 4F:
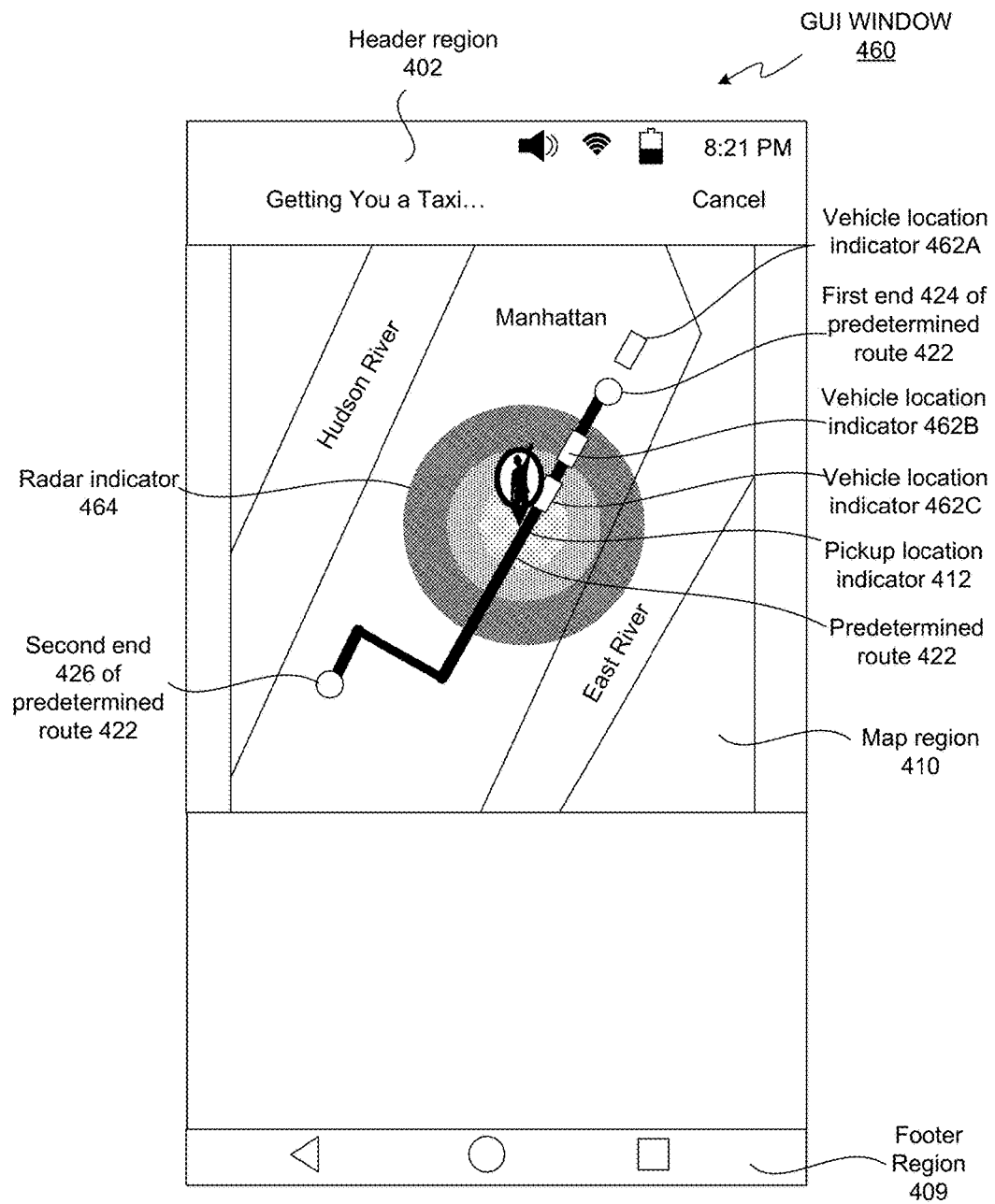
FIG. 4F illustrates an exemplary GUI window for transmitting the transportation vehicle request according to another implementation of the disclosure.

FIG. 4F illustrates an exemplary GUI window 460 window for transmitting the transportation vehicle request according to another implementation of the disclosure. The GUI window 460 may be displayed upon selection of the user selection button 408 in FIG. 4E to transmit the transportation vehicle request. The header region 402 may display "Getting You a Taxi . . . " In some implementations, the GUI window 460 includes a cancel option 612 that allows the user to cancel the order request. In one embodiment, canceling the request will return to a previous GUI window (e.g., GUI window 450, GUI window 400, GUI window 420, etc.).

The map region 410 may display one or more of the predetermined route 422, the first end 424 of the predetermined route 422, the second end of the predetermined rout 422, or the pickup location indicator 412.

The map region 410 may also depict vehicle location indicators 462A-464C which correspond to current locations of transportation vehicles in the surrounding geographical area.

In some implementations, vehicle information (e.g., driver name, vehicle type, etc.) is displayed adjacent to or as part of vehicle location indicators 462A-462C. In some implementations, the GUI window 460 may display location related information that is received from the transportation server (e.g., the tracking module 204 of the predetermined route component 200).

In some implementations, the map region 410 also includes a radar indicator 464 that corresponds to a pre-defined range of the search for transportation vehicles. In some implementations, the order placement module 206 transmits the order request to vehicle computing devices of transportation vehicles within the pre-defined range (e.g., vehicles depicted by vehicle location indicators 464B and 464C). In one embodiment, the order placement module 206 transmits the order request to all transportation vehicles associated with a geographical area or location. In another embodiment, the order placement module 206 transmits the order request to all transportation vehicles associated with the predetermined route 422. In another embodiment, the order placement module 206 transmits the order request to the transportation vehicles one by one in a prioritized order by vehicle that is closest to the pickup location. For example, the order placement module 206 may send a request first to the vehicle corresponding to vehicle location indicator 462C, and then if not accepted within a threshold amount of time (e.g., five seconds, fifteen seconds, thirty seconds, etc.), to the vehicle corresponding to vehicle location indicator 462B, and then if not accepted within a threshold amount of time, to the vehicle corresponding to vehicle location indicator 462A.

In some implementations, the user may select one or more transportation vehicles manually (e.g., by touching, clicking, or otherwise indicating selection of) one or more of vehicle location indicators 462A-462C on the client computing device, which may result in the order placement module 206 transmitting the order request to the one or more selected transportation vehicles. In another implementation, the user may select one or more transportation vehicles from a list of transportation vehicles that includes relevant information for each of the transportation vehicles. In some implementations, the GUI window 460 also includes a search progress indicator (e.g., a bar or pie graph in the GUI window 460) that provides information about the progress of the search for a transportation vehicle (e.g., the bar grows as more transportation vehicles are located).

In one implementation, the tracking module 204 may determine estimated times of arrival for each of the transportation vehicles to which the order request was transmitted. The transportation vehicle with the fastest estimated time of arrival may be assigned as the transportation vehicle that is to pick up the user. In one implementation, the predetermined route component 200 (e.g., using the messaging module 208) transmits a message to the vehicle computing device of the assigned transportation vehicle indicating to the driver that he/she is to pick up the user at a designated pick-up location corresponding to the pickup location indicator 412. In some implementations, pick-up location data is automatically imported into a GPS device located on-board the transportation vehicle.

In some implementations, one or more responses received from vehicle computing devices may indicate that one or more drivers have declined the order request. In some implementations, if the order request is not accepted within a pre-determined time duration (e.g., 30 seconds, 1 minute, 5 minutes, etc.), a message may be transmitted (e.g., by the messaging module 208) to the client computing device of the user indicating that the search for a transportation vehicle has failed.

Figure 4G:
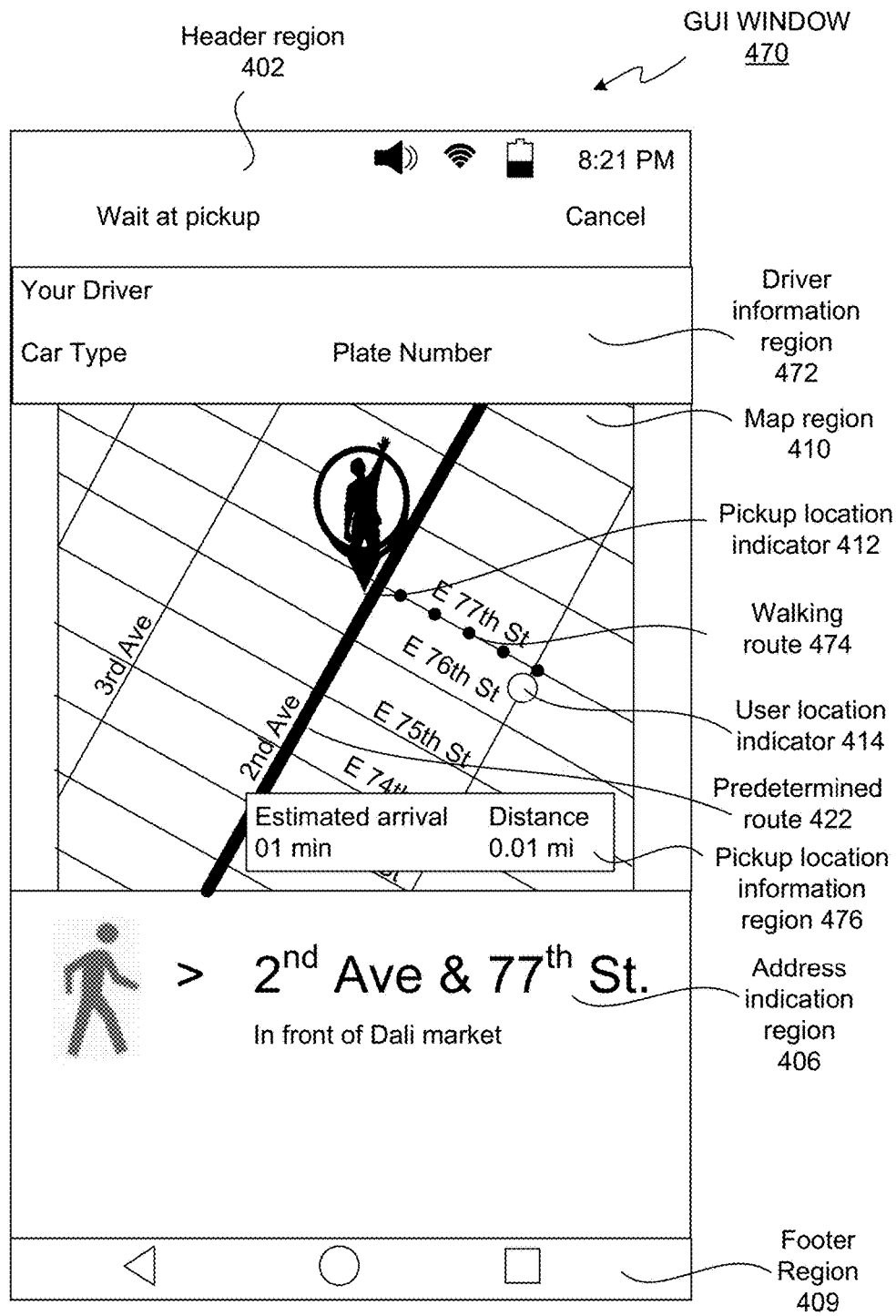
FIG. 4G illustrates an exemplary GUI window for waiting for pickup by the transportation vehicle according to an implementation of the disclosure.

FIG. 4G illustrates an exemplary GUI window 470 for waiting for pickup by the transportation vehicle according to an implementation of the disclosure. The GUI window 470 indicates that a transportation vehicle has been assigned to pick up the user (e.g., displayed after a driver has accepted the transportation vehicle request). The header region 402 may display "Wait at pickup." In some implementations, the GUI window 460 includes a cancel option 612 that allows the user to cancel the order request. In one embodiment, canceling the request will return to a previous GUI window (e.g., GUI window 450, GUI window 400, GUI window 410, etc.). In one implementation, the GUI window 470 includes a close button that may cause the GUI window 470 to return to a default screen.

A driver information region 472 displays information about the driver that has accepted the transportation vehicle request. The driver information may include one or more of driver name, driver photo, driver user rating (e.g., 0-5 starts based on previous user ratings), vehicle type (e.g., make, model, color, etc.), vehicle plate number, driver/vehicle number, etc. The driver information region 472 may also display an option to call the driver. In one embodiment, the driver information region 472 displays a phone icon that when selected, the client computing device calls the driver. In another device, the driver information region 472 lists the phone number of the driver.

The map region 410 may display one or more of the predetermined route 422, the pickup location indicator 412, the user location indicator 414, etc. The map region 410 may also display a walking route 474 from the user location indicator 414 to the pickup location indicator 412. The walking route 474 may display one or more of the shortest walking distance, the shortest walk time, or the safest walking route from the user location indicator 414 to the pickup location indicator 412. In one embodiment, the map region displays a vehicle location indicator 462 corresponding to the assigned transportation vehicle. In some implementations, the map is updated in real-time to illustrate one or more of the transportation vehicle or client computing device approaching the pickup location.

The map region 410 may display a pickup location information region 476 which may include one or more of the estimated arrival time (e.g., it will take 1 minute for the user to walk from the user location to the pickup location; it will take 1 minute for the driver to arrive at the pickup location, etc.), the walking distance (e.g., 0.01 from the user location to the pickup location, 0.01 from the transportation vehicle location to the pickup location, etc.).

The address indication region 406 may display the pickup location address (e.g., $2^{nd}$ Ave & $77^{th}$ St), pickup location description (e.g., in front of Dali market), an icon (e.g., a walking icon indicating the user is to walk to the pickup location, a stop icon indicating for the user to wait at the pickup location, etc.).

Figure 4H:
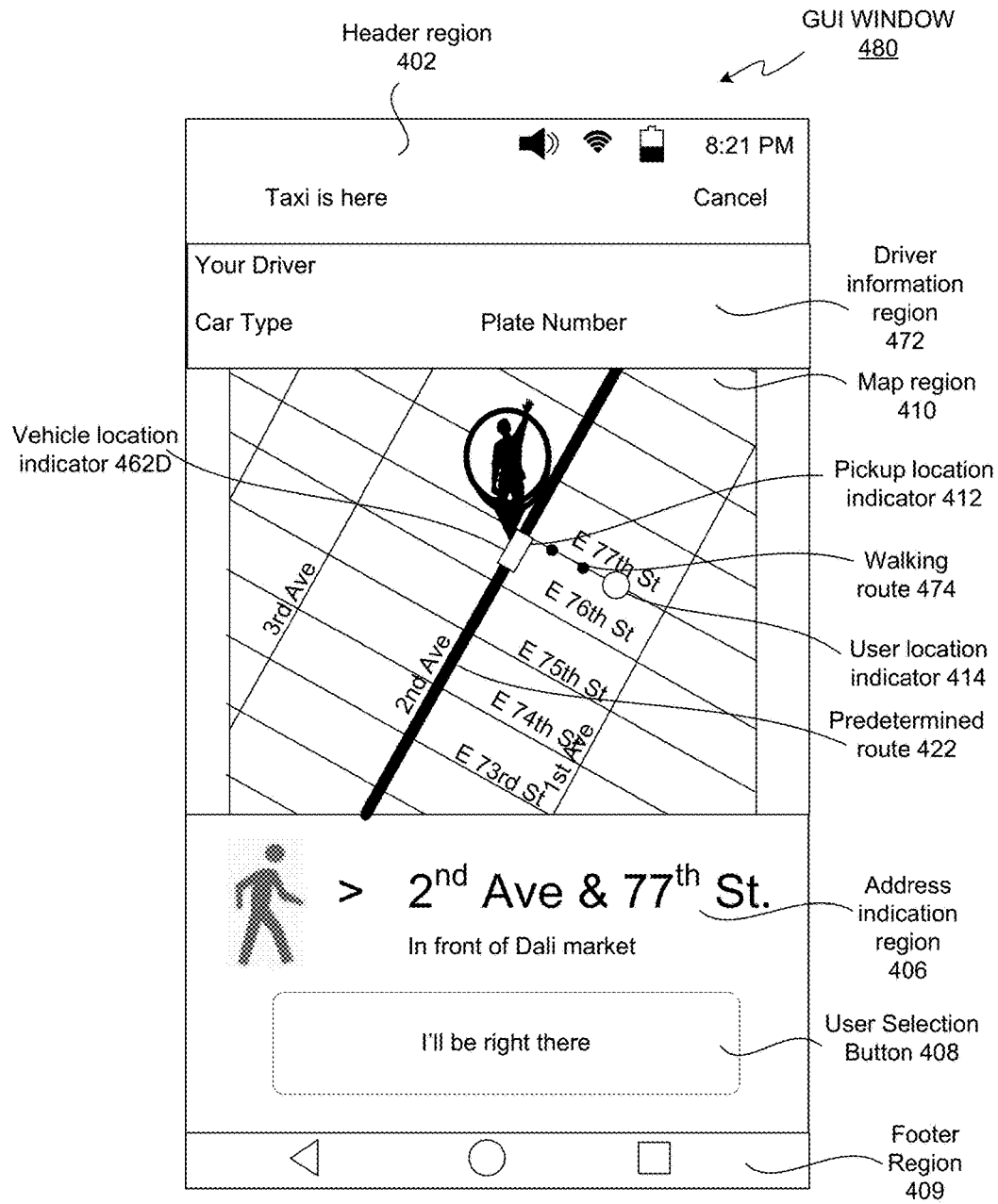
FIG. 4H illustrates an exemplary GUI window for indicating arrival of the transportation vehicle according to an implementation of the disclosure.

FIG. 4H illustrates an exemplary GUI window 480 for indicating arrival of the transportation vehicle according to an implementation of the disclosure. The GUI window 480 may indicate to the user when the driver assigned to pick up the user has arrived (e.g., is displayed after a driver that has accepted the transportation vehicle request has arrived at the pickup location). The header region 402 may display "taxi is here." In some implementations, the GUI window 460 includes a cancel option 612 that allows the user to cancel the order request. In one embodiment, canceling the request will return to a previous GUI window (e.g., GUI window 450, GUI window 400, GUI window 410, etc.).

In one implementation, the tracking module 204 may determine that a transportation vehicle has arrived at the pick-up location. For example, based on received pickup location data and vehicle location data, the tracking module 204 may determine that the transportation vehicle is within a pre-defined range of the pickup location (e.g., within 10 feet, within 20 feet, etc.). The tracking module 204 may indicate that the GUI window 480 is to be displayed.

The map region 410 may display an updated user location indicator 414 and walking route 474 to display an updated location of the client computing device 120A and an updated route between the user location and the pickup location. The map region 410 may also display a vehicle location indicator 462D at the pickup location. In one embodiment, the map region 410 may display the vehicle location indicator 462 at the current vehicle location for all or part of the time from transmitting the transportation vehicle request in GUI window 460 of FIG. 4F, while waiting for the vehicle in GUI window 470 of FIG. 4G, and after the vehicle has arrived at the pickup location in GUI window 480 of FIG. 4H.

The user selection button 408 may indicate that the user will arrive soon at the pickup location. In response to a user selection of user selection button 408 in GUI window 480, the messaging module 208 of predetermined route component 200 may send a message to the vehicle computing device 150A that the user will be arriving soon. In one embodiment, if the user does not contact the driver within a first threshold amount of time of the driver arriving at the pickup location, the user will be charged or penalized (e.g., receive a lower rating, be excluded from the transportation system, etc.). In another embodiment, if the user does not arrive at the pickup location within a second threshold amount of time of selecting the user selection button 408 of GUI window 480, the user will be charged or penalized. In another embodiment, if the user cancels the request after a third threshold amount of time of transmitting the request, the user may be charged or penalized.

In one embodiment, an additional GUI window may display one or more of "on board" in the header region 402 while the user is riding in the transportation vehicle in response to the transportation vehicle request, display the vehicle location indicator 462D corresponding to the current location of the vehicle, display the pickup location indicator 412 at the current location of the client computing device, display the user location indicator 414 at the current location of the client computing device, the predetermined route 422, the drop off location indicator 442, an estimated time of arrival (e.g., at the drop off location given current traffic), the address of the current location, the address of the drop off location, a button to invite friends (e.g., invite friends to the transportation service), a button for payment and tip (e.g., adjust the tip before, during, or after the ride), an option to see more, etc.

In another embodiment, an additional GUI window may display "ride summary" and "done" in the header region 402. A payment region of the additional GUI may display payment details (e.g., fare, additional fee, tip, total) and the corresponding amounts. A rating region may display an option to select "poor" or "good." Upon selection of "poor" or "good," rating GUI window may be displayed with "let us know why" and "done" in the header region 402 and a text box and prompt requesting of input to indicate why the service was "good" or "poor."

In another implementation, an additional GUI window may be presented in the event that one or more of no transportation vehicle was located for the user, the driver en route to the pick-up location is unable to pick up the user, or the predetermined route not operating at the current time. The additional GUI window may be presented for display by a user device executing the transportation application. In some implementations, the additional GUI window is presented for display if there are no transportation vehicles within a threshold range of the location of the client computing device or a selected pickup location.

In another embodiment, the client computing device may automatically present a default GUI window when there is no user interaction for a particular duration of time (e.g., 10 seconds, 30 seconds, one minute, etc.). For example, after 5 seconds of inactivity, a timer appears with a countdown for 5 seconds before returning to the default GUI window. This timer feature may also be implemented by any of the GUI windows disclose herein.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture, such as a computer-readable device or storage medium, to facilitate transporting and transferring such methods to computing devices. Accordingly, the term "article of manufacture," as used herein, is intended to include a computer program accessible from any computer-readable device or storage medium.

Figure 5:
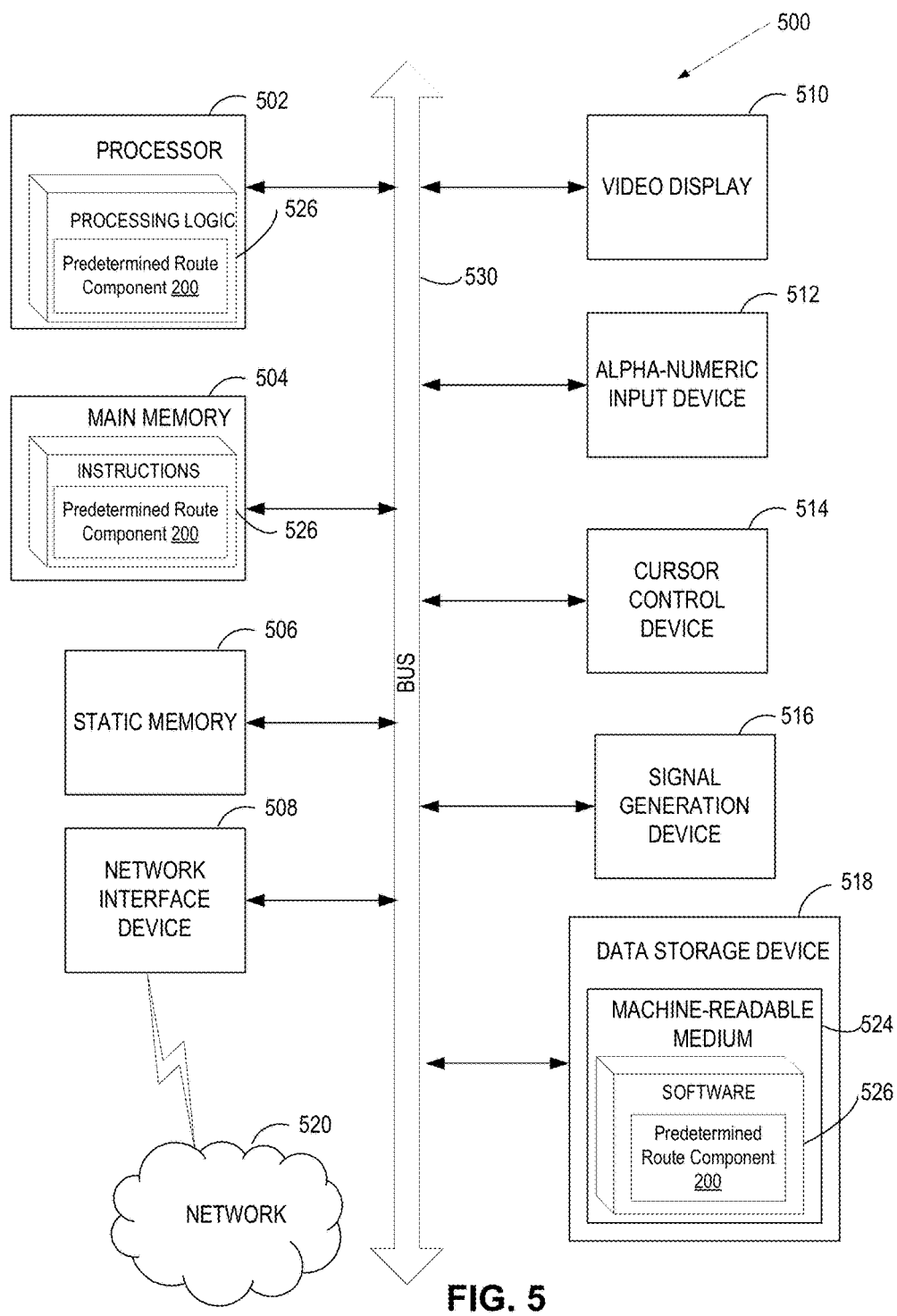
FIG. 5 is a block diagram illustrating an exemplary computer system for use in accordance an implementation of the disclosure.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a PC, a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 500 may be utilized by or illustrative of any of the transportation server 110, the client computing devices 120A-120Z, the data store 130, the vehicle computing devices 150A-150Z, and the map data server 160.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a CISC microprocessor, a RISC microprocessor, a VLIW microprocessor, or a processor implementing other instruction sets or processors implementing a combination of instruction sets. The processor 502 may also be one or more special-purpose processing devices such as an ASIC, an FPGA, a DSP, a network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker). In some implementations, the signal generation device 520 may include a vibrational actuator (e.g., for providing haptic feedback).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 (e.g., the network 105) via the network interface device 522.

In one implementation, the instructions 526 include instructions for one or more predetermined route components 200, which may correspond to the identically-named counterpart described with respect to FIGS. 1 and 2. While the computer-readable storage medium 524 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The terms "computer-readable storage medium" or "machine-readable storage medium" shall accordingly be taken to include, but not be limited to, solid-state memories, optical media, and magnetic media.

The above description sets forth numerous specific details such as examples of specific systems, components, methods and so forth, in order to provide a thorough understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "establishing," "receiving," "transmitting," "determining," "accessing," "displaying," "relocating," "snapping," "sending," "detecting," "forwarding," "caching," "causing," "providing," "generating," "adding," "subtracting," "removing," "estimating," "analyzing," "enabling," "identifying," "modifying" or the like, refer to the actions and processes of a computer system, or similar electronic computing device, that manipulate and transform data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   establishing a communication session, over a network, between a server computing device and a client computing device, the server computing device comprising a processing device;
   receiving, via the communication session from the client computing device, a first user selection of a predetermined route comprising a plurality of segments, wherein each of the plurality of segments corresponds to a geographical location along the predetermined route;
   transmitting, by the processing device to the client computing device, data to cause a graphical user interface (GUI) representation of a map comprising at least a portion of the predetermined route and a proposed pickup location corresponding to a third segment of the plurality of segments on the predetermined route to be rendered for display via a device interface of the client computing device;
   responsive to a first map drag input via the client computing device to drag the map from the proposed pickup location to a first location, receiving, via the communication session from the client computing device, a first indication of the first location on the GUI representation of the map;

determining a pickup location corresponding to a first segment of the plurality of segments that is proximate the first location;

responsive to a second map drag input via the client computing device to drag the map to a second location, receiving, via the communication session from the client computing device, a second indication of the second location on the GUI representation of the map;

determining a drop off location corresponding to a second segment of the plurality of segments that is proximate the second location;

receiving, via the communication session from the client computing device, a transportation vehicle request corresponding to the pickup location and the drop off location; and transmitting, by the processing device, the transportation vehicle request, the pickup location, and the drop off location to a communication device of a transportation vehicle.

2. The method of claim 1, further comprising:

receiving, via the communication session, a device location of the client computing device; and determining the predetermined route is most proximate to the device location out of one or more predetermined routes, wherein the transmitting of the data to cause the GUI representation of the map comprising the at least a portion of the predetermined route to be rendered is subsequent to the determining the predetermined route is the most proximate and prior to the receiving of the first user selection.

3. The method of claim 1, further comprising, prior to receiving the first indication of the first location:

receiving, via the communication session, a device location of the client computing device;

determining the third segment is most proximate to the device location out of the plurality of segments; and transmitting, by the processing device to the client computing device, data to cause the GUI representation of the map to further comprise a first object and a second object to be rendered for display via the device interface of the client computing device, wherein the first object corresponds to the device location and the second object corresponds to the third segment, the second object comprising the proposed pickup location.

4. The method of claim 1, further comprising, prior to receiving the second indication of the second location:

accessing user history corresponding to the client computing device;

determining a fourth segment of the plurality of segments corresponds to a previous drop off location in the accessed user history; and in response to the determining the fourth segment corresponds to the previous drop off location, transmitting, by the processing device to the client computing device, data to cause the GUI representation of the map to further comprise a third object to be rendered for display via the device interface of the client computing device, wherein the third object corresponds to the fourth segment and the third object comprises a proposed drop off location.

5. The method of claim 1, wherein the GUI representation of the map is to:

display a first object at the proposed pickup location corresponding to the third segment of the plurality of segments;

relocate the first object to the first location on the GUI representation of the map in response to receiving the first map drag input; and snap the first object to the first segment subsequent to receiving the first map drag input, wherein the first segment is most proximate to the first location out of the plurality of segments.

6. The method of claim 1, wherein the GUI representation of the map is to:

display a second object at a proposed drop off location corresponding to a fourth segment of the plurality of segments;

relocate the second object to the second location on the GUI representation of the map in response to receiving the second map drag input; and snap the second object to the second segment subsequent to the receiving the second map drag input, wherein the second segment is most proximate to the second location out of the plurality of segments.

7. The method of claim 1, wherein each geographic location along the predetermined route is where one or more transportation vehicles are allowed to pick up or drop off users.

8. An apparatus comprising:

a memory;

a processing device of a client computing device, coupled to the memory, the processing device to:

establish a communication session, over a network, between the client computing device and a server computing device;

transmit, via the communication session to the server computing device, a first user selection of a predetermined route comprising a plurality of segments, wherein each of the plurality of segments corresponds to a geographical location along the predetermined route;

receive, via the communication session from the server computing device, data to cause a graphical user interface (GUI) representation of a map comprising at least a portion of the predetermined route and a proposed pickup location corresponding to a third segment of the plurality of segments on the predetermined route to be rendered for display via a device interface of the client computing device;

receive a first map drag input to drag the map from the proposed pickup location to a first location on the GUI representation of the map;

transmit, via the communication session to the server computing device a first indication of the first location on the GUI representation of the map, wherein the server computing device is to determine a pickup location corresponding to a first segment of the plurality of segments that is proximate the first location;

receive a second map drag input to drag the map to a second location on the GUI representation of the map;

transmit, via the communication session to the server computing device a second indication of the second location, wherein the server computing device is to determine a drop off location corresponding to a second segment of the plurality of segments that is proximate the second location; and transmit, via the communication session to the server computing device, a transportation vehicle request corresponding to the pickup location and the drop off location, wherein the server computing device to transmit the transportation vehicle request, the pickup location, and the drop off location to a communication device of a transportation vehicle.

9. The apparatus of claim 8, wherein the processing device is further to:
transmit, via the communication session to the server computing device, a device location of the client computing device, wherein the processing device to receive the data to cause the GUI representation of the map comprising the at least a portion of the predetermined route to be rendered subsequent to the server computing device determining the predetermined route is most proximate to the device location out of one or more predetermined routes and prior to the processing device transmitting the first user selection.

10. The apparatus of claim 8, wherein, prior to transmitting the first indication of the first location, the processing device is further to:
transmit, via the communication session to the server computing device, a device location of the client computing device, wherein the server computing device to determine the third segment is most proximate to the device location out of the plurality of segments; and
receive, from the server computing device, data to cause the GUI representation of the map to further comprise a first object and a second object to be rendered for display via the device interface of the client computing device, wherein the first object corresponds to the device location and the second object corresponds to the third segment, the second object comprising the proposed pickup location.

11. The apparatus of claim 8, wherein the GUI representation of the map is to:
display a first object at the proposed pickup location corresponding to the third segment of the plurality of segments;
relocate the first object to the first location on the GUI representation of the map in response to receiving the first map drag input; and
snap the first object to the first segment subsequent to receiving the first map drag input, wherein the first segment is most proximate to the first location out of the plurality of segments.

12. The apparatus of claim 8, wherein the GUI representation of the map is to:
display a second object at a proposed drop off location corresponding to a fourth segment of the plurality of segments;
relocate the second object to the second location on the GUI representation of the map in response to receiving the second map drag input; and
snap the second object to the second segment subsequent to the receiving the second map drag input, wherein the second segment is most proximate to the second location out of the plurality of segments.

13. The apparatus of claim 8, wherein each geographic location along the predetermined route is where one or more transportation vehicles are allowed to pick up or drop off users.

14. A non-transitory machine-readable storage medium including instructions that, when accessed by a processing device of a server computing device, cause the processing device to perform operations comprising:
establishing a communication session, over a network, between the server computing device and a client computing device;
receiving, via the communication session from the client computing device, a first user selection of a predetermined route comprising a plurality of segments, wherein each of the plurality of segments corresponds to a geographical location along the predetermined route;
transmitting, by the processing device to the client computing device, data to cause a graphical user interface (GUI) representation of a map comprising at least a portion of the predetermined route and a proposed pickup location corresponding to a third segment of the plurality of segments on the predetermined route to be rendered for display via a device interface of the client computing device;
responsive to a first map drag input via the client computing device to drag the map from the proposed pickup location to a first location, receiving, via the communication session from the client computing device, a first indication of the first location on the GUI representation of the map;
determining a pickup location corresponding to a first segment of the plurality of segments that is proximate the first location;
responsive to a second map drag input via the client computing device to drag the map to a second location, receiving, via the communication session from the client computing device, a second indication of the second location on the GUI representation of the map;
determining a drop off location corresponding to a second segment of the plurality of segments that is proximate the second location;
receiving, via the communication session from the client computing device, a transportation vehicle request corresponding to the pickup location and the drop off location; and
transmitting, by the processing device, the transportation vehicle request, the pickup location, and the drop off location to a communication device of a transportation vehicle.

15. The non-transitory machine-readable storage medium of claim 14, wherein the operations further comprising:
receiving, via the communication session, a device location of the client computing device; and
determining the predetermined route is most proximate to the device location out of one or more predetermined routes, wherein the transmitting of the data to cause the GUI representation of the map comprising the at least a portion of the predetermined route is subsequent to the determining the predetermined route is the most proximate and prior to the receiving of the first user selection.

16. The non-transitory machine-readable storage medium of claim 14, wherein the operations further comprising, prior to receiving the first indication of the first location:
receiving, via the communication session, a device location of the client computing device;
determining the third segment is most proximate to the device location out of the plurality of segments; and
transmitting, by the processing device to the client computing device, data to cause the GUI representation of the map to further comprise a first object and a second object to be rendered for display via the device interface of the client computing device, wherein the first object corresponds to the device location and the second object corresponds to the third segment, the second object comprising the proposed pickup location.

17. The non-transitory machine-readable storage medium of claim 14, wherein the operations further comprising, prior to receiving the second indication of the second location:
- accessing user history corresponding to the client computing device;
- determining a fourth segment of the plurality of segments corresponds to a previous drop off location in the accessed user history; and
- in response to the determining the fourth segment corresponds to the previous drop off location, transmitting, by the processing device to the client computing device, data to cause the GUI representation of the map to further comprise a third object to be rendered for display via the device interface of the client computing device, wherein the third object corresponds to the fourth segment and the third object comprises a proposed drop off location.

18. The non-transitory machine-readable storage medium of claim 14, wherein the GUI representation of the map is to:
- display a first object at the proposed pickup location corresponding to the third segment of the plurality of segments;
- relocate the first object to the first location on the GUI representation of the map in response to receiving the first map drag input; and
- snap the first object to the first segment subsequent to receiving the first map drag input, wherein the first segment is most proximate to the first location out of the plurality of segments.

19. The non-transitory machine-readable storage medium of claim 14, wherein the GUI representation of the map is to:
- display a second object at a proposed drop off location corresponding to a fourth segment of the plurality of segments;
- relocate the second object to the second location on the GUI representation of the map in response to receiving the second map drag input; and
- snap the second object to the second segment subsequent to the receiving the second map drag input, wherein the second segment is most proximate to the second location out of the plurality of segments.

20. The non-transitory machine-readable storage medium of claim 14, wherein each geographic location along the predetermined route is where one or more transportation vehicles are allowed to pick up or drop off users.

* * * * *